US006944100B2

(12) United States Patent
Sakamoto et al.

(10) Patent No.: US 6,944,100 B2
(45) Date of Patent: Sep. 13, 2005

(54) METHOD FOR REPRODUCING INFORMATION DATA FROM A MAGNETO-OPTICAL STORAGE MEDIUM IN REVERSE DIRECTION WITH RECORDING

(75) Inventors: Tetsuhiro Sakamoto, Tokyo (JP); Yasuhito Tanaka, Tokyo (JP); Kazuhiko Fujiie, Kanagawa (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 10/384,710

(22) Filed: Mar. 11, 2003

(65) Prior Publication Data

US 2003/0214886 A1 Nov. 20, 2003

(30) Foreign Application Priority Data

Mar. 12, 2002 (JP) ....................................... 2002-066368

(51) Int. Cl.[7] ................................................ G11B 11/00
(52) U.S. Cl. .................................. 369/13.08; 369/13.06
(58) Field of Search ........................... 369/13.05, 13.06, 369/13.07, 13.08, 13.47, 13.52, 13.54, 13.55, 275.4; 428/694 ML, 694 MM; 365/122

(56) References Cited

U.S. PATENT DOCUMENTS 5,546,118 A * 8/1996 Ido ............................ 725/115
6,104,676 A * 8/2000 Yamamoto ............... 369/13.54
6,122,229 A * 9/2000 Yonezawa ................ 369/13.08
6,298,015 B1 * 10/2001 Ishii et al. ............... 369/13.17
6,608,799 B2 * 8/2003 Hozumi ................... 369/13.26

* cited by examiner

*Primary Examiner*—Tan Dinh
(74) *Attorney, Agent, or Firm*—Oblon, Spivak, McClelland, Maier & Neustadt, P.C.

(57) ABSTRACT

A magneto-optical recording/reproducing method is disclosed which causes a laser beam to be emitted to a disc recording medium having information recorded thereon earlier by magnetic field modulation, the laser beam causing the disc recording medium to develop a temperature distribution such as to generate a driving force for moving a domain wall of a magnetic domain in the medium so that the magnetic domain smaller in diameter than a spot of the laser beam is expanded sufficiently to let information recorded in the domain be detected. The method comprises the steps of: recording information to the disc recording medium while rotating the medium in a first rotating direction; and reproducing the information that was recorded to the disc recording medium in the recording step while rotating the medium in a second rotating direction reverse to the first rotating direction.

24 Claims, 25 Drawing Sheets

F I G. 1
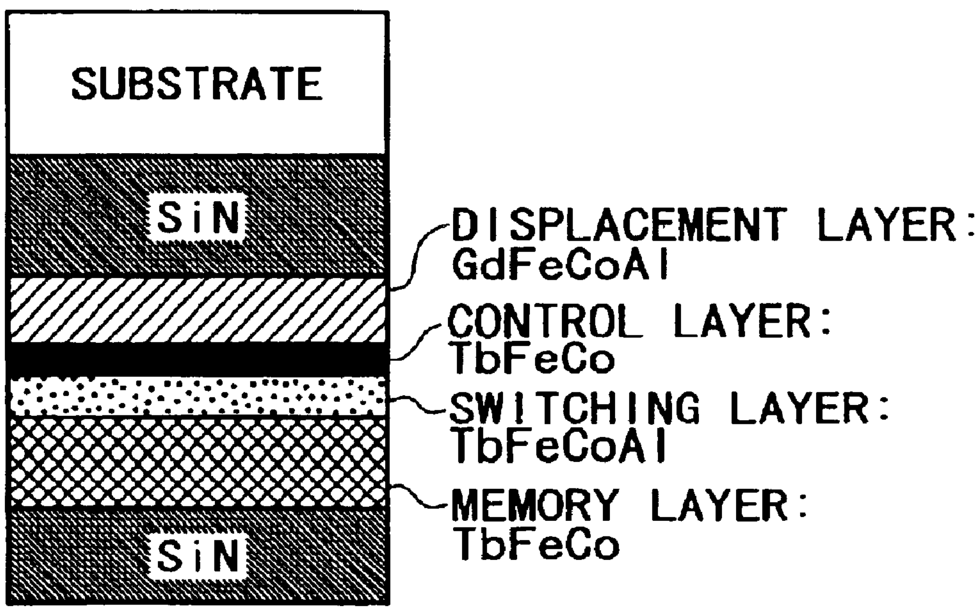

FORWARD TO FORWARD
(REVERSE TO REVERSE)

FORWARD TO REVERSE
(REVERSE TO FORWARD)

FORWARD TO FORWARD
(REVERSE TO REVERSE)

FORWARD TO REVERSE
(REVERSE TO FORWARD)

FIG. 12

| EMBODIMENTS | | LANDS | | GROOVES | | |
|---|---|---|---|---|---|---|
| | | RECORDING | RE-PRODUCTION | RECORDING | RE-PRODUCTION | |
| 1 | | FORWARD | REVERSE | FORWARD | REVERSE | DISC ROTATING DIRECTION IS REVERSED BETWEEN RECORDING AND REPRODUCTION |
| 2 | | REVERSE | FORWARD | REVERSE | FORWARD | |
| 3 | | FORWARD | REVERSE | REVERSE | FORWARD | DISC ROTATING DIRECTION IS REVERSED BETWEEN RECORDING AND REPRODUCTION AS WELL AS BETWEEN LANDS AND GROOVES |
| 4 | | REVERSE | FORWARD | FORWARD | REVERSE | |
| 5 | 5a | FORWARD | REVERSE | FORWARD | FORWARD | DISC ROTATING DIRECTION IS REVERSED BETWEEN RECORDING AND REPRODUCTION ON LANDS ONLY |
| | 5b | | | (REVERSE) | (REVERSE) | |
| 6 | 6a | REVERSE | FORWARD | FORWARD | FORWARD | |
| | 6b | | | (REVERSE) | (REVERSE) | |
| 7 | 7a | FORWARD | FORWARD | FORWARD | REVERSE | DISC ROTATING DIRECTION IS REVERSED BETWEEN RECORDING AND REPRODUCTION ON GROOVES ONLY |
| | 7b | (REVERSE) | (REVERSE) | | | |
| 8 | 8a | FORWARD | FORWARD | REVERSE | FORWARD | |
| | 8b | (REVERSE) | (REVERSE) | | | |

F I G. 15
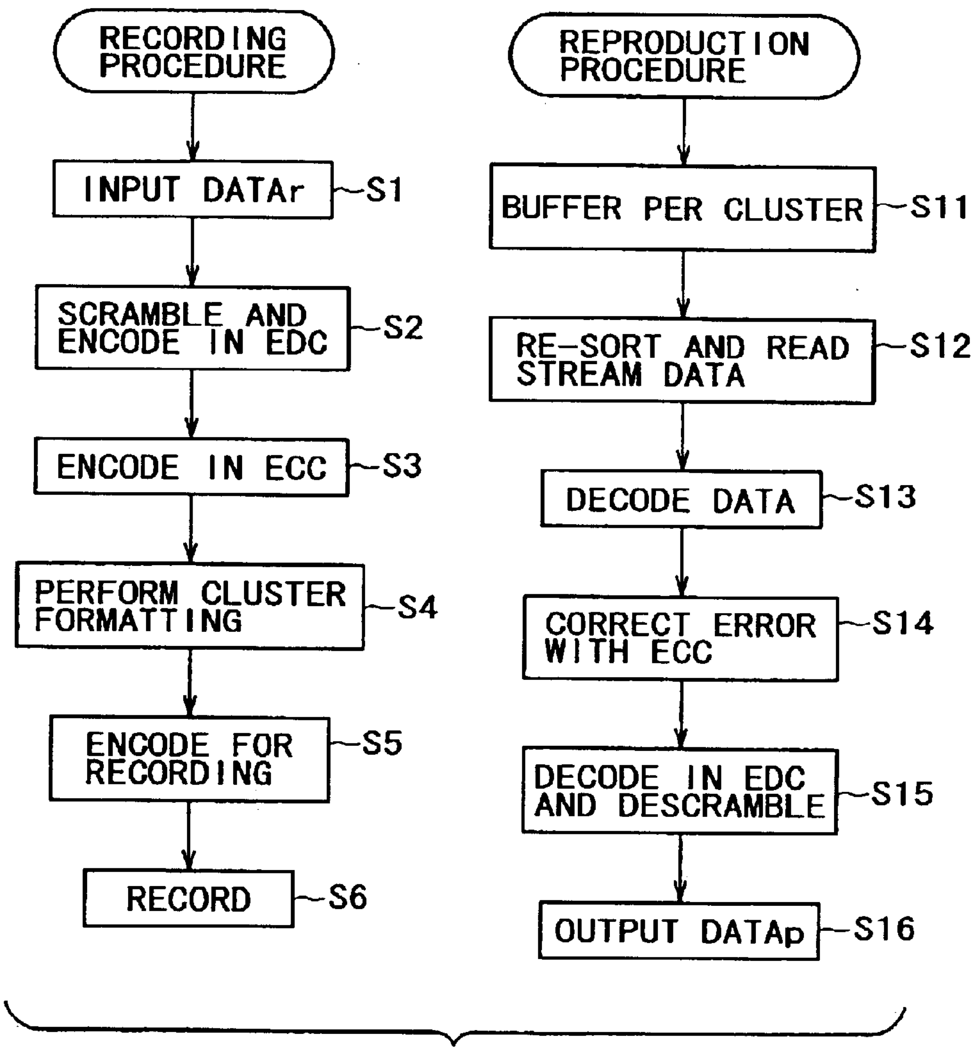

F I G. 2 3
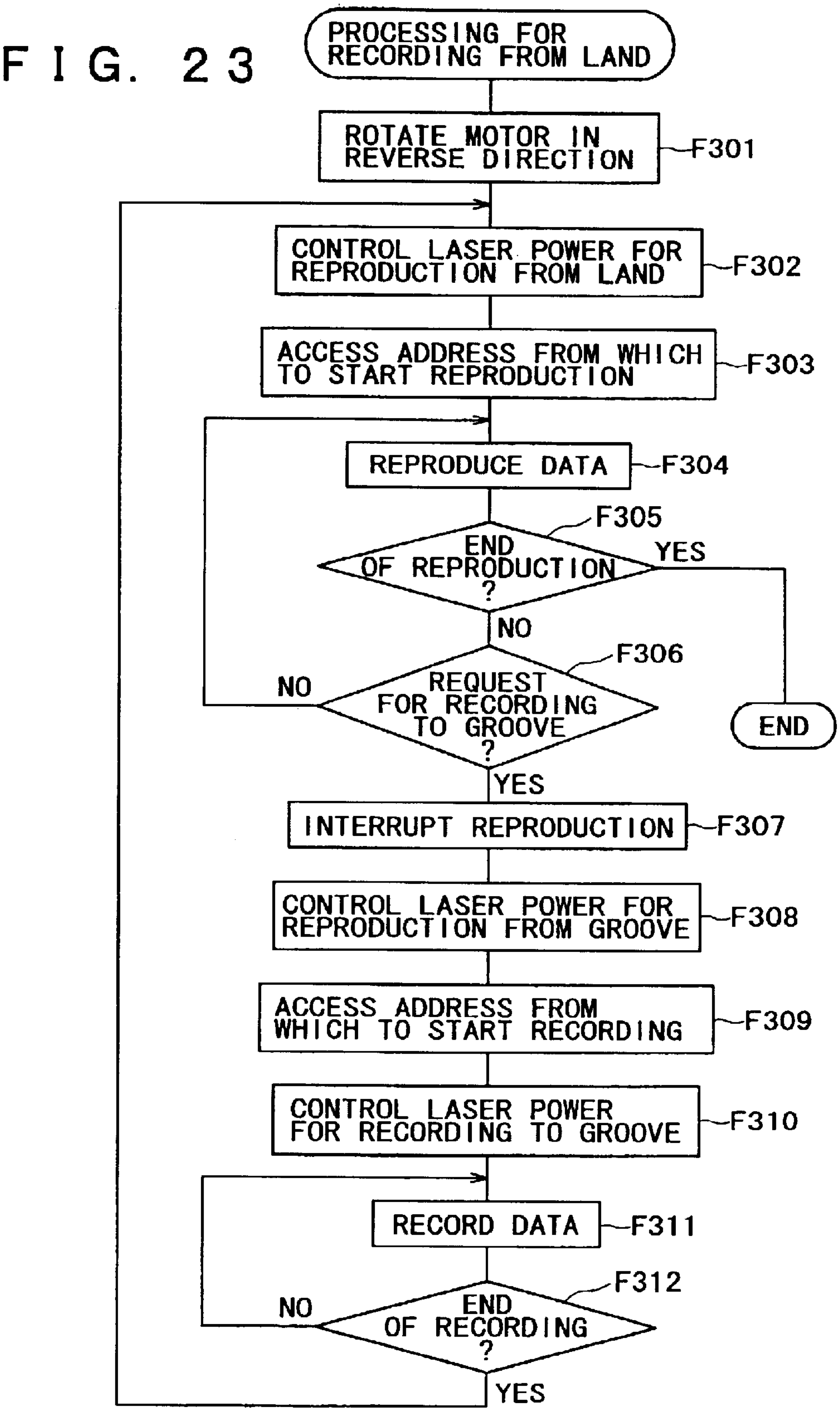

METHOD FOR REPRODUCING INFORMATION DATA FROM A MAGNETO-OPTICAL STORAGE MEDIUM IN REVERSE DIRECTION WITH RECORDING

BACKGROUND OF THE INVENTION

The present invention relates to a magneto-optical recording/reproducing method, a disc recording medium, and a magneto-optical recording/reproducing apparatus making use of magnetic field modulation and domain wall displacement detection, or magnetic amplifying magneto-optical system technology.

Optical discs and magneto-optical discs have gained widespread acceptance as disc recording media today, even as diverse techniques for mass data storage on these discs are being developed. One such mass storage technique involves narrowing the track pitch so as to increase recording density in the radial direction on the disc.

One way to reduce the track pitch is by having recourse to so-called land and groove recording whereby data are recorded to both grooves and lands on the disc. Land and groove recording is effective in boosting track density, because it basically doubles the track density ensured solely by groove recording or by land recording. In particular, implementing a land and groove recording scheme provides high track density without reducing the diameter of the laser beam spot used to record or reproduce data.

The so-called Magnetically Induced Super Resolution (MSR) technology has been found effective as a magneto-optical recording medium-oriented technique intended for mass data storage on the magneto-optical disc in terms of track direction density. Some magneto-optical recording media, such as domain wall displacement detection media and magnetic amplifying magneto-optical system media, permit a huge increase in linear recording density without being limited theoretically by wavelength parameters of an optical system in use or by the numerical aperture (NA) of an objective lens incorporated.

Generally, however, attempts to boost track density in the land and groove recording setup tend to narrow the allowable range of laser power levels at the time of recording. That is because data signals held illustratively in grooves can be deleted accidentally while data are being recorded to lands. In particular, where the above-mentioned domain wall displacement detection medium or magnetic amplifying magneto-optical system medium is used, the allowable range of laser power levels for recording is considerably limited.

The reduced margins of laser power require that laser power levels be controlled within correspondingly narrow ranges. That in turn makes it necessary to minimize deviations between individual recording media manufactured, differences between individual optical parts, and fluctuations in ambient temperature and humidity. These requirements entail increased manufacturing costs and a decline in production efficiency. Since there are numerous cases where the dependency on laser power at the time of recording or reproduction varies between lands and grooves, implementation of a stable optical disc system requires very complicated control schemes.

SUMMARY OF THE INVENTION

The present invention has been made in view of the above circumstances and provides a recording/reproducing method for ensuring sufficiently large margins of laser power when adopting magnetic field modulation in conjunction with a domain wall displacement detection medium or a magnetic amplifying magneto-optical system medium or when utilizing land and groove recording for high density recording, so that high signal quality is ensured during recording and reproduction, that the manufacturing costs of recording media and recording/reproducing apparatuses are lowered, and that the production efficiency of such media and apparatuses is enhanced.

In carrying out the invention and according to a first aspect thereof, there is provided a magneto-optical recording/reproducing method for emitting a laser beam to a disc recording medium having information recorded thereon earlier by magnetic field modulation, the laser beam causing the disc recording medium to develop a temperature distribution such as to generate a driving force for moving a domain wall of a magnetic domain in the medium so that the magnetic domain smaller in diameter than a spot of the laser beam is expanded sufficiently to let information recorded in the domain be detected, the magneto-optical recording/reproducing method including the steps of: recording information to the disc recording medium while rotating the medium in a first rotating direction; and reproducing the information that was recorded to the disc recording medium in the recording step, while rotating the medium in a second rotating direction reverse to the first rotating direction.

In one preferred variation according to the first aspect of the invention, the disc recording medium may have at least a groove track and a land track formed thereon, the groove track and the land track being both used to record information.

In another preferred variation according to the invention, the magneto-optical recording/reproducing method may further includes the steps of rotating the disc recording medium in the first rotating direction when recording information to the land track and the groove track, and of rotating the disc recording medium in the second rotating direction when reproducing the information from the land track and the groove track.

In a further preferred variation according to the invention, the magneto-optical recording/reproducing method may further includes the steps of rotating the disc recording medium in the first rotating direction when recording information to the land track and reproducing information from the groove track, and of rotating the disc recording medium in the second rotating direction when recording information to the groove track and reproducing information from the land track.

In an even further preferred variation according to the invention, the magneto-optical recording/reproducing method may further includes the step of switching the rotating direction of the disc recording medium from the first rotating direction to the second rotating direction or vice versa with regard to either the land track or the groove track only, between the recording and the reproduction of information to and from the track being selected.

In a still further preferred variation according to the invention, the magneto-optical recording/reproducing method may further includes the steps of: switching the rotating direction of the disc recording medium from the first rotating direction to the second rotating direction or vice versa between the recording of information to the land track and the recording of information to the groove track; alternating the recording of information to the land track and the reproduction of information from the groove track without switching the rotating direction of the disc recording medium in between; and alternating the recording of information to the groove track and the reproduction of information from the land track without switching the rotating direction of the disc recording medium in between.

In a yet further preferred variation according to the invention, the magneto-optical recording/reproducing method may further includes the step of calibrating at least part of optimal laser power levels for recording to the land track, for reproduction from the land track, for recording to the groove track, and for reproduction from the groove track while rotating the disc recording medium in the same direction as that most recently in effect.

In another preferred variation according to the invention, the magneto-optical recording/reproducing method may further includes the step of calibrating optimal laser power levels for recording to the land track, for reproduction from the land track, for recording to the groove track, and for reproduction from the groove track consecutively without switching the rotating direction of the disc recording medium.

In a further preferred variation according to the invention, the recording step may further includes the steps of formatting a data stream, which is information to be recorded to the disc recording medium, in units of error-correcting blocks, and of encoding the formatted data stream for recording to the disc recording medium; and the reproducing step may further includes the steps of re-sorting a data stream read from the disc recording medium in the units used in the formatting step, and of decoding the re-sorted data stream for reproduction.

In an even further preferred variation according to the invention, the recording step may further includes the steps of re-sorting a data stream, which is information to be recorded to the disc recording medium, in units of error-correcting blocks, and of formatting the re-sorted data stream for recording to the disc recording medium; and the reproducing step may further includes the step of decoding a data stream read from the disc recording medium in the units used in the formatting step for reproduction.

Preferably, the formatting step may further includes supplementing the data stream with header data made up of a bit string having the same sequence in a forward and a reverse direction of the data stream.

According to a second aspect of the invention, there is provided a disc recording medium having information recorded thereon by magnetic field modulation, the disc recording medium being subjected to emission of a laser beam thereby to develop a temperature distribution such as to generate a driving force for moving a domain wall of a magnetic domain in the medium so that the magnetic domain smaller in diameter than a spot of the laser beam is expanded sufficiently to let information recorded in the domain be detected; wherein the disc recording medium has at least a groove track and a land track formed thereon, the groove track and the land track being both used to record information; and wherein a wing shape of a magnetic domain recorded on the land track is oriented in a direction reverse to that of a wing shape of a magnetic domain recorded on the groove track.

According to a third aspect of the invention, there is provided a magneto-optical recording/reproducing apparatus for use with a disc recording medium having information recorded thereon by magnetic field modulation, the apparatus emitting a laser beam to the disc recording medium thereby to develop a temperature distribution such as to generate a driving force for moving a domain wall of a magnetic domain in the medium so that the magnetic domain smaller in diameter than a spot of the laser beam is expanded sufficiently to let information recorded in the domain be detected, the magneto-optical recording/reproducing apparatus including: a magneto-optical head element for writing and reading information to and from the disc recording medium; a write signal processing element which, upon recording of information to the disc recording medium, supplies the magneto-optical head element with write data having undergone a predetermined signal process; a read signal processing element which, upon reproduction of information from the disc recording medium, obtains read data by performing a predetermined signal process on data read from the disc recording medium by the magneto-optical head element; a rotating element for rotating the disc recording medium; and a controlling element for causing the rotating element to rotate the disc recording medium in a first rotating direction while information is being recorded to the medium, the controlling element further causing the rotating element to rotate the disc recording medium in a second rotating direction reverse to the first rotating direction while the information recorded to the medium is being reproduced therefrom.

In one preferred structure according to the third aspect of the invention, the disc recording medium may have at least a groove track and a land track formed thereon, and the magneto-optical head element may record information to both the groove track and the land track.

In another preferred structure according to the invention, the controlling element may cause the rotating element to rotate the disc recording medium in the first rotating direction while information is being recorded to the land track and the groove track, the controlling element further causing the rotating element to rotate the disc recording medium in the second rotating direction while information is being reproduced from the land track and the groove track.

In a further preferred structure according to the invention, the controlling element may cause the rotating element to rotate the disc recording medium in the first rotating direction while information is being recorded to the land track and reproduced from the groove track, the controlling element further causing the rotating element to rotate the disc recording medium in the second rotating direction while information is being recorded to the groove track and reproduced from the land track.

In an even further preferred structure according to the invention, the controlling element may cause the rotating element to switch the rotating direction of the disc recording medium from the first rotating direction to the second rotating direction or vice versa with regard to either the land track or the groove track only, between the recording and the reproduction of information to and from the track being selected.

In a still further preferred structure according to the invention, the controlling element may cause the rotating element to switch the rotating direction of the disc recording medium from the first rotating direction to the second rotating direction or vice versa between the recording of information to the land track and the recording of information to the groove track; the controlling element may further alternate the recording of information to the land track and the reproduction of information from the groove track without switching the rotating direction of the disc recording medium in between; and the controlling element may further alternate the recording of information to the groove track and the reproduction of information from the land track without switching the rotating direction of the disc recording medium in between.

In a yet further preferred structure according to the invention, the controlling element may further calibrate at least part of optimal laser power levels for recording to the land track, for reproduction from the land track, for recording to the groove track, and for reproduction from the groove track while rotating the disc recording medium in the same direction as that most recently in effect.

In another preferred structure according to the invention, the controlling element may further calibrate optimal laser power levels for recording to the land track, for reproduction from the land track, for recording to the groove track, and for reproduction from the groove track consecutively without switching the rotating direction of the disc recording medium.

In a further preferred structure according to the invention, upon recording, the write signal processing element may further format a data stream, which is information to be recorded to the disc recording medium, in units of error-correcting blocks, and encode the formatted data stream before supplying the encoded data stream to the magneto-optical head element for recording to the disc recording medium; and upon reproduction, the read signal processing element may further re-sort a data stream read by the magneto-optical head element from the disc recording medium, in the units used in the formatting, and decodes the re-sorted data stream for reproduction.

In an even further preferred structure according to the invention, upon recording, the write signal processing element may further re-sort a data stream, which is information to be recorded to the disc recording medium, in units of error-correcting blocks, and format the re-sorted data stream before supplying the formatted data stream to the magneto-optical head element for recording to the disc recording medium; and upon reproduction, the read signal processing element may further decode a data stream read by the magneto-optical head element from the disc recording medium, in the units used in the formatting.

Preferably, the formatting performed by the write signal processing element may further includes supplementing the data stream with header data made up of a bit string having the same sequence in a forward and a reverse direction of the data stream.

According to the invention, as outlined above, information is recorded by magnetic field modulation to a magneto-optical recording medium rotated in one direction and is reproduced from the medium rotated in the direction reverse to that in effect upon recording. The recording medium is typically composed of a domain wall displacement detection medium or a magnetic amplifying magneto-optical system medium which, triggered by a specific temperature distribution produced therein, develops a driving force to move domain walls thereby amplifying/reducing magnetic domains so that amplified signals are detected from the domains.

Where signals are reproduced in the direction reverse to that of recording (in what is called the tracing of tracks), significant reductions are observed in jitter levels regarding linear recording density and with respect to the laser power levels for recording and reproduction. That means the tolerable range of laser power levels (i.e., laser power margins) is expanded appreciably in recording and reproducing signals to and from the medium, whereby high signal quality is maintained. In a setup in which signals are detected from the recording medium being rotated in the direction reverse to that of recording, the laser power margins will not be inordinately constrained even as higher recording densities are pursued. This can be a major benefit in the processes for designing and manufacturing more advantageous recording media and recording/reproducing apparatuses.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is an explanatory view of disc layer structure according to the invention;

FIG. 12 is an explanatory diagram listing recording/reproducing methods as different embodiments of the invention;

FIG. 15 is a flowchart of recording and reproducing steps embodying the invention;

FIG. 23 is a flowchart of steps for reproduction from lands according to the invention;

DESCRIPTION OF THE PREFERRED EMBODIMENTS

Figure 2:
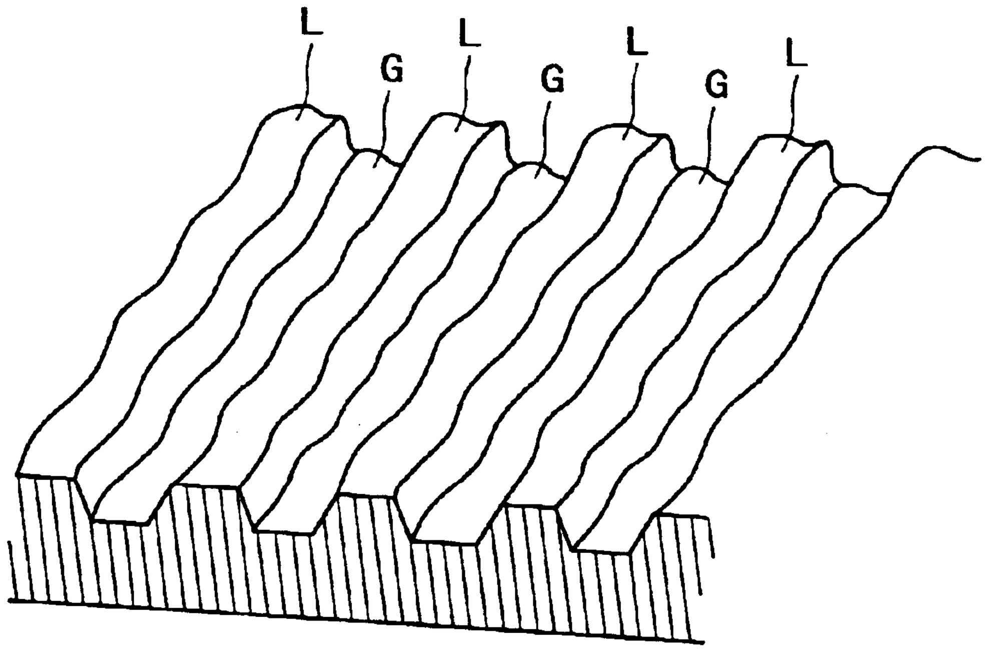
FIG. 2 is an explanatory view of a disc track structure according to the invention.

A magneto-optical recording/reproducing method, a disc recording medium, and a magneto-optical recording/reproducing apparatus embodying this invention will now be described. In the ensuing description, the disc, which is reversed in its rotation between recording and reproduction, is said to be in the "forward" rotating direction when turned clockwise as viewed from the side of laser beam incidence, and is said to be in the "reverse" rotating direction when turned counterclockwise. A "first" rotating direction refers to either the forward or the reverse rotating direction, and a "second" rotating direction signifies the reverse of the first rotating direction. In other words, if the first rotating direction refers to the forward rotating direction in a given context, then the second rotating direction is regarded as the reverse rotating direction in that context; if the first rotating direction refers to the reverse rotating direction in another context, then the second rotating direction is taken as the forward rotating direction in that context.

The description will be made under the following headings:

1. Disc structure
2. Experiments on characteristics regarding disc rotating directions
   - 2.1 Linear recording density characteristic
   - 2.2 Reproduction power characteristic
   - 2.3 Recording power characteristic
   - 2.4 Characteristics regarding the disc rotating directions on land and groove tracks
   - 2.5 Examination of the experiments
3. Embodiments of the recording/reproducing method
4. Structure of the recording/reproducing apparatus
5. Data processing for recording and reproduction
6. Alternate land and groove recording and reproduction
   - 6.1 Processing for recording to land tracks
   - 6.2 Processing for recording to groove tracks
   - 6.3 Processing for reproduction from land tracks
   - 6.4 Processing for reproduction from groove tracks
7. Processing for laser power calibration
8. Other variations of the invention

1. Disc Structure

The disc according to the invention is any one of the domain wall displacement detection media and magnetic amplifying magneto-optical system media. A typical domain wall displacement detection medium is described below.

The disc, subjected to the experiments to be discussed below, was manufactured as follows: FIG. 1 shows a layered structure of the manufactured disc. A magneto-optical recording layer (made up of component layers including a displacement layer, a control layer, a switching layer and a memory layer) and an SiN film for protecting the recording layer were formed by a magnetron sputtering machine. The ingredient targets were Gd, Tb, Fe, Fe:70 Co:30 alloy, Al, and Si. The target outside diameter was 6 inches, with the centers of the targets located at equal intervals on the circumference. The distance between the substrate mounting surface and the target layout surface was set for 150 mm.

An optical disc substrate for land and groove recording was mounted on a palette before being placed in a chamber. The chamber was evacuated to $1\times10^{-4}$ Pa or less. Then argon and nitrogen gases were allowed to flow at a ratio of 4 to 1 into the chamber while Si was subjected to reactive sputtering to form an SiN film about 35 nm thick on the substrate. Thereafter, with the argon gas allowed to flow, the magneto-optical recording layer was formed one component layer after another.

As shown in FIG. 1, the magneto-optical recording layer has a structure of multiple films with a combined film thickness of about 110 nm. The film formed closest to the substrate is a GdFeCoAl film (displacement layer), followed by a TbFeCo film (control layer), a TbFeCoAl film (switching layer) and a TbFeCo film (memory layer), in that order. Another SiN film was formed to a thickness of about 35 nm over the film assembly, topped by an Al alloy film about 30 nm thick. The compositions of the ingredients in each of the films and the film thicknesses were determined so that the finished disc would function as a domain wall displacement detection medium.

Normally, the magneto-optical recording layer as the domain wall displacement detection medium is constituted by a displacement layer, a switching layer, and a memory layer. The principle of domain wall displacement (i.e., functions of the displacement layer, switching layer and memory layer) will be discussed later with reference to FIGS. 7A through 7C. The control layer, not discussed further because it is relevant only indirectly to the invention, is designed to minimize the so-called ghost phenomenon observed upon detection of a domain wall displacement.

The land and groove recording method is adopted for use with the disc of this embodiment. On the disc surface, grooves G (for guide purposes) are formed illustratively in spiral (or concentric) fashion as shown in FIG. 2. A land L is formed between two grooves G. That means the lands L are also formed in spiral (or concentric) fashion. Both the lands L and the grooves G are used as recording tracks. The lands L and grooves G are called land tracks and groove tracks respectively when used for recording.

For recording, the track pitch was set for 0.38 μm and the depth of the groove G for 43 nm. The disc was manufactured by first forming grooves on a glass master by reactive ion etching (RIE). From the glass master, a metal stamper was prepared and used in producing a plastic substrate by injection molding. The plastic substrate thus formed was utilized to produce a disc with the above-described grooves G and lands L formed thereon.

The grooves G are formed in wobbling fashion as shown schematically in FIG. 2. The wobbling of the grooves G is determined on the basis of modulation waveforms at absolute addresses. At the time of recording or reproduction, wobble components are read out in order to recognize addresses on the disc. The absolute addresses recorded by wobbling are called ADIP (addresses in pregroove).

As described above, the disc embodying this invention is a domain wall displacement detection medium that permits high-density recording in conjunction with the land and groove recording method.

2. Experiments on Characteristics Regarding Disc Rotating Directions 2.1 Linear Recording Density Characteristic Various experiments were conducted using the inventive disc. In the experiments, an optical system having a semiconductor laser arrangement with a wavelength of 405 nm and an objective lens with a numerical aperture of 0.60 was used to record and reproduce data to and from the disc. At the time of recording, random signals coded by RLL (1, 7) modulation were recorded using pulse strobe field modulation with a pulse duty of about 35 percent. Upon reproduction, jitter (data to clock) was observed as the yardstick for evaluation with a channel clock of 18 MHz. The bit length, adjusted by linear velocity, was set for 0.13 μm/bit when the dependencies on reproduction laser power and on recording laser power were measured. The allowable range of jitter levels was set for 15 percent or less as reproduced signal quality.

First, the linear recording density versus jitter characteristic was measured in two cases: when the disc was rotated in the same direction for both recording and reproducing data to and from the disc, and when the disc rotating direction was reversed between the recording and the reproduction. After getting recorded in this manner, the random signals were reproduced and their jitter levels measured at different linear recording densities.

In the description that follows, "forward to forward" rotation experiments signify that data are recorded and reproduced while the disc is rotated in the same forward direction; and "forward to reverse" rotation experiments mean that data are recorded with the disc rotated in the forward direction and are reproduced with the disc turned in the reverse direction. The "forward to forward" rotation experiments will be discussed first, followed by a description of the "forward to reverse" rotation experiments. Although not discussed hereunder, "reverse to reverse" and "reverse to forward" rotation experiments were found to yield the same results as the "forward to forward" and "forward to reverse" rotation experiments respectively.

Figure 3:
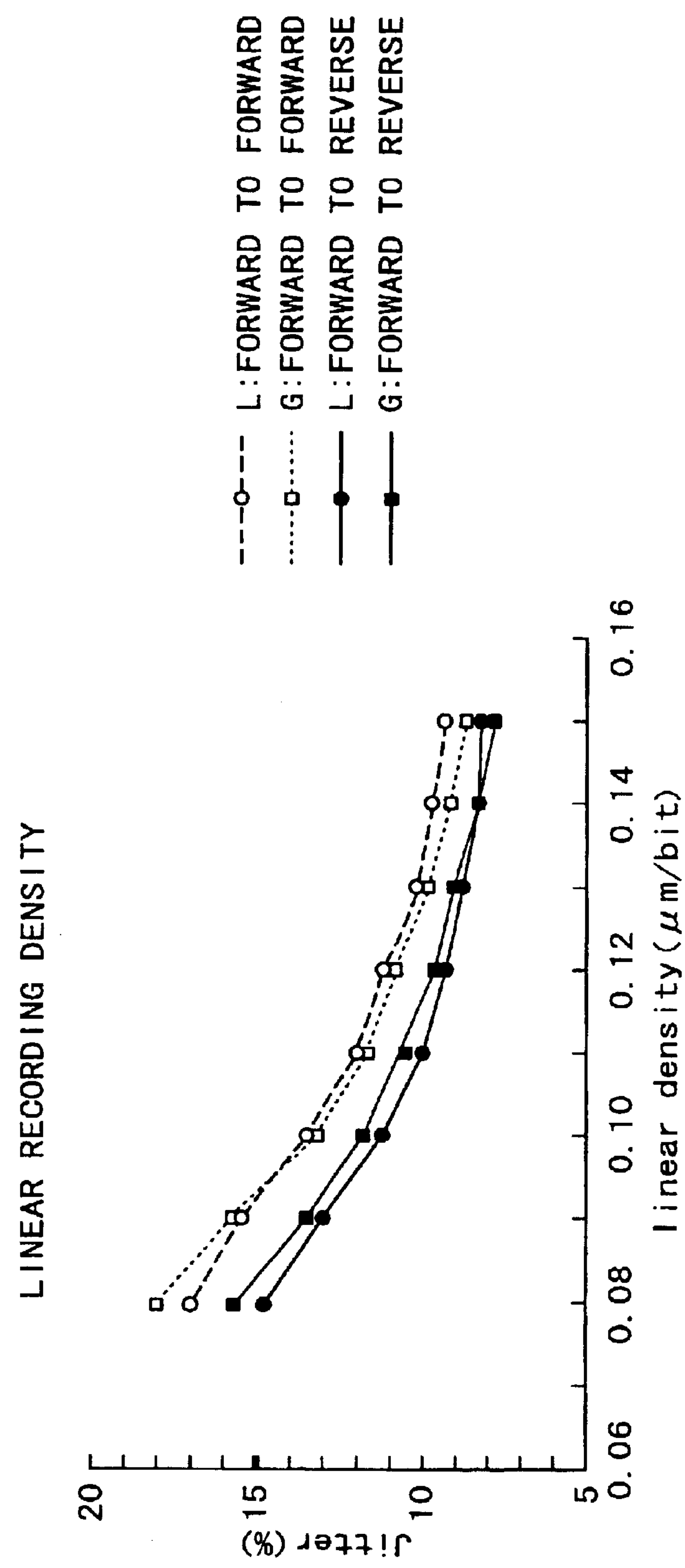
FIG. 3 is an explanatory diagram of relations between control over disc rotating directions on the one hand and a linear recording density characteristic on the other hand.

FIG. 3 graphically shows measurements of the linear recording density versus jitter characteristic. In the figure, small hollow circles connected by broken lines represent the measurements taken in "forward to forward" rotation experiments on land tracks with a linear recording density of 0.08 to 0.15 μm/bit; small hollow squares connected by broken lines denote the measurements taken in "forward to forward" rotation experiments on groove tracks with the linear recording density of 0.08 to 0.15 μm/bit; small solid circles connected by solid lines stand for the measurements taken in "forward to reverse" rotation experiments on land tracks with the linear recording density of 0.08 to 0.15 μm/bit; and small solid squares connected by solid lines indicate the measurements taken in "forward to reverse" rotation experiments on groove tracks with the linear recording density of 0.08 to 0.15 μm/bit.

As can be seen in FIG. 3, jitter levels are shown lower where the disc rotating direction was reversed between recording and reproduction. The jitter level difference was particularly pronounced where the bit length was small. That means reproduction in the direction reverse to that of recording is significantly effective in reducing bottom jitter and boosting linear recording density. Because the measurements were similar on both land tracks and groove tracks, the jitter reducing effect is shown obtainable regardless of the lands or grooves being used. The bit length at jitter levels of 15 percent or less is found to be 0.095 μm/bit in the "forward to forward" rotation experiments and 0.08 μm/bit in the "forward to reverse" rotation experiments. That is, the linear recording density can be improved by about 20 percent when the disc rotating direction is reversed between recording and reproduction.

2.2 Reproduction Power Characteristic

The reproduction power versus jitter characteristic was measured under the above-described recording and reproduction conditions. The linear velocity was set for 1.56 m/sec, with a linear density of 0.13 μm/bit in effect. At the time of recording, random data were written to the disc at power levels at which the jitter level was satisfactory. Later, jitter level changes were measured while the reproduction laser power level was varied approximately between 1.0 (mW) and 2.2 (mW).

Figure 4:
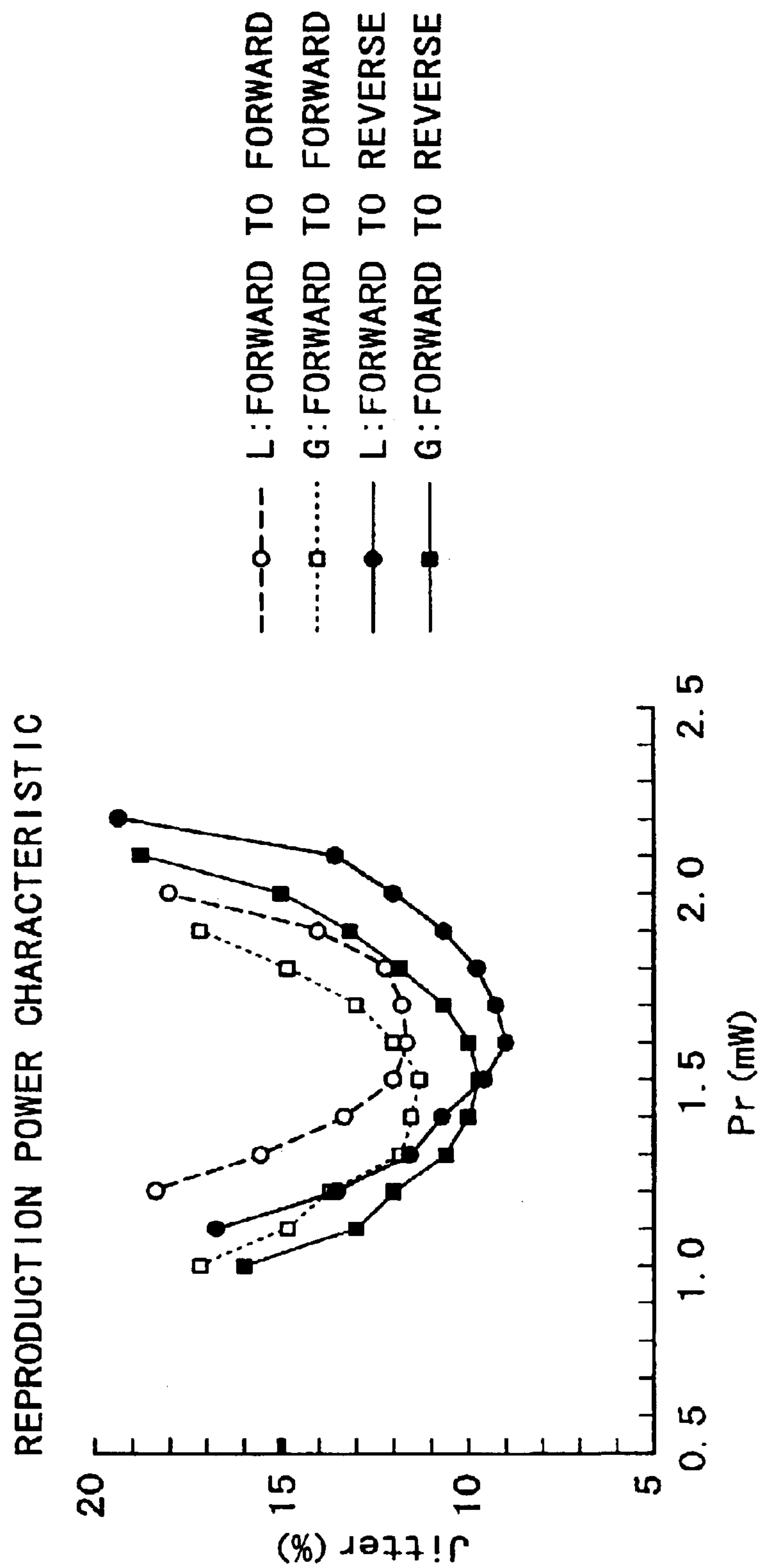
FIG. 4 is an explanatory diagram of relations between control over disc rotating directions on the one hand and a reproduction power characteristic on the other hand.

FIG. 4 graphically shows measurements of the reproduction power versus jitter characteristic. In the figure, as above, small hollow circles connected by broken lines represent the measurements taken on land tracks in "forward to forward" rotation experiments; small hollow squares connected by broken lines denote the measurements taken on groove tracks in "forward to forward" rotation experiments; small solid circles connected by solid lines stand for the measurements taken on land tracks in "forward to reverse" rotation experiments; and small solid squares connected by solid lines indicate the measurements taken on groove tracks in "forward to reverse" rotation experiments.

The above measurements indicate that jitter levels are lower when the disc rotating direction is reversed between recording and reproduction, with the allowable range of reproduction laser power levels expanded. The difference in laser power dependency between groove and land tracks was about 20 percent in terms of sensitivity in the "forward to forward" rotation experiments and 10 percent or less in the "forward to reverse" rotation experiments. That means an appreciable reduction in the difference in sensitivity.

Significant characteristic changes were measured on the land tracks. When the jitter levels are 15 percent or less, the margins of reproduction laser power around a median were ±18.4 percent on land tracks and ±25.5 percent on groove tracks in the "forward to forward" rotation experiments, and ±29.9 percent on land tracks and ±31.1 percent on groove tracks in the "forward to reverse" rotation experiments.

2.3 Recording Power Characteristic

The recording power versus jitter characteristic was measured under the above-described recording and reproduction conditions. Specifically, the measurements were about overwrite and cross write characteristics. The linear velocity was set for 1.56 m/sec, with the linear density of 0.13 μm/bit in effect. At the time of recording, laser power levels were varied. Upon reproduction, data were read out at power levels at which the jitter level was satisfactory while jitter level changes were being measured.

Upon measurement of the overwrite characteristic, data were first written to recording tracks at a sufficiently high laser power level of 7.5 mW. Later, data were overwritten to the same tracks while the laser power level was gradually raised from a low level. Upon reproduction, jitter levels were measured at each of the different laser power levels that had been used for overwriting.

The cross write characteristic on land tracks was measured by observing how the laser power for writing to the lands would affect groove tracks. Specifically, measuring the cross write characteristic on land tracks involves first writing data to a groove track at a suitable recording laser power level of, say, 6.0 mW. Then data were written to two adjacent land tracks while the laser power level was gradually raised from a low level. After the writing, jitter levels were measured while data were being reproduced from the groove track. That is, the jitter levels on the groove track were measured at each of the different laser power levels that had been used for writing data to the land tracks.

The cross write characteristic on groove tracks was measured by observing how the laser power for writing to the grooves would affect land tracks. Specifically, measuring the cross write characteristic on groove tracks involves first writing data to a land track at a suitable recording laser power level of, say, 6.0 mW. Then data were written to two adjacent groove tracks while the laser power level was gradually raised from a low level. After the writing, jitter levels were measured while data were being reproduced from the land track. That is, the jitter levels on the land track were measured at each of the different laser power levels that had been used for writing data to the groove tracks.

Figure 5:
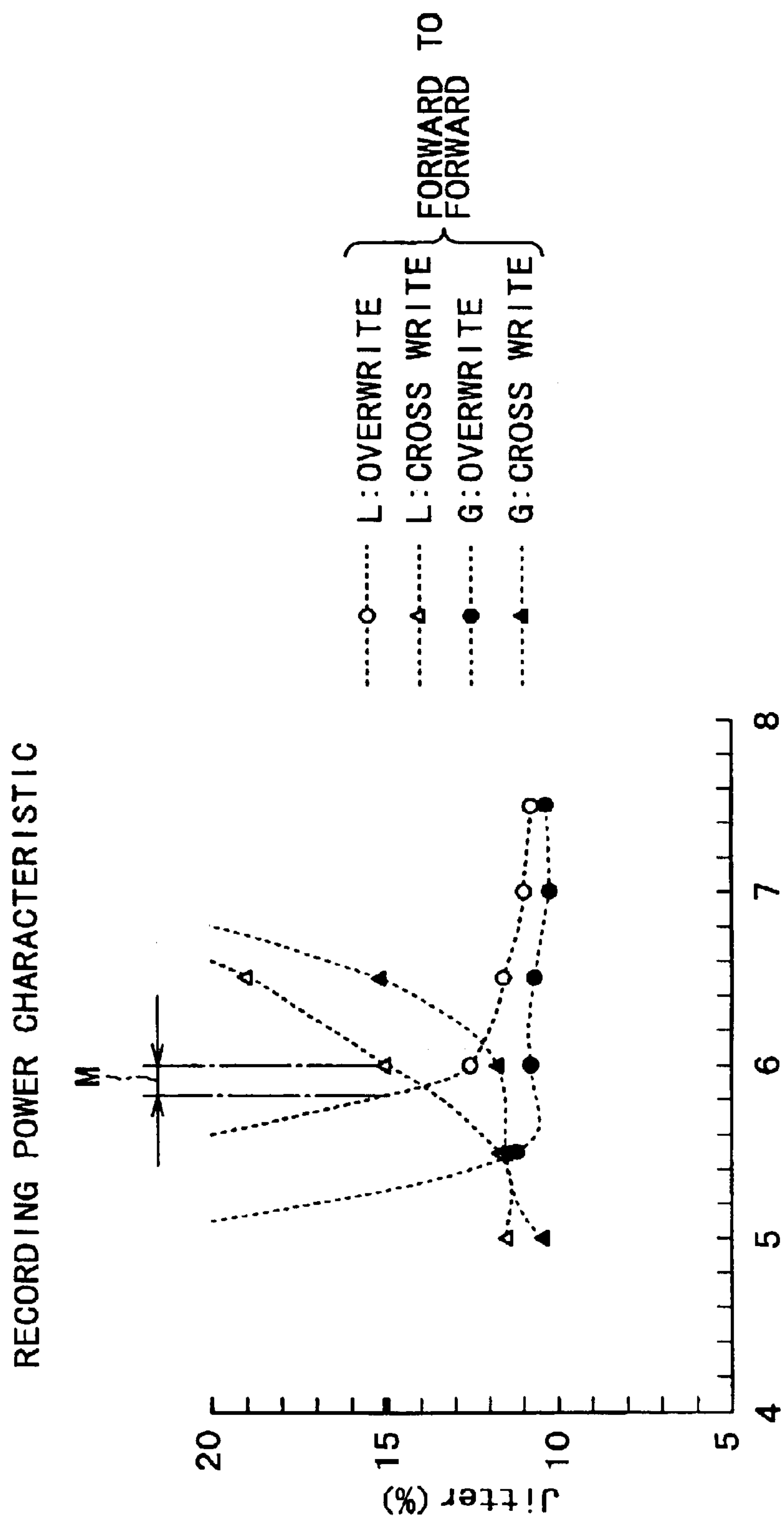
FIG. 5 is an explanatory diagram of relations between control over disc rotating directions on the one hand and a recording power characteristic on the other hand.
Figure 6:
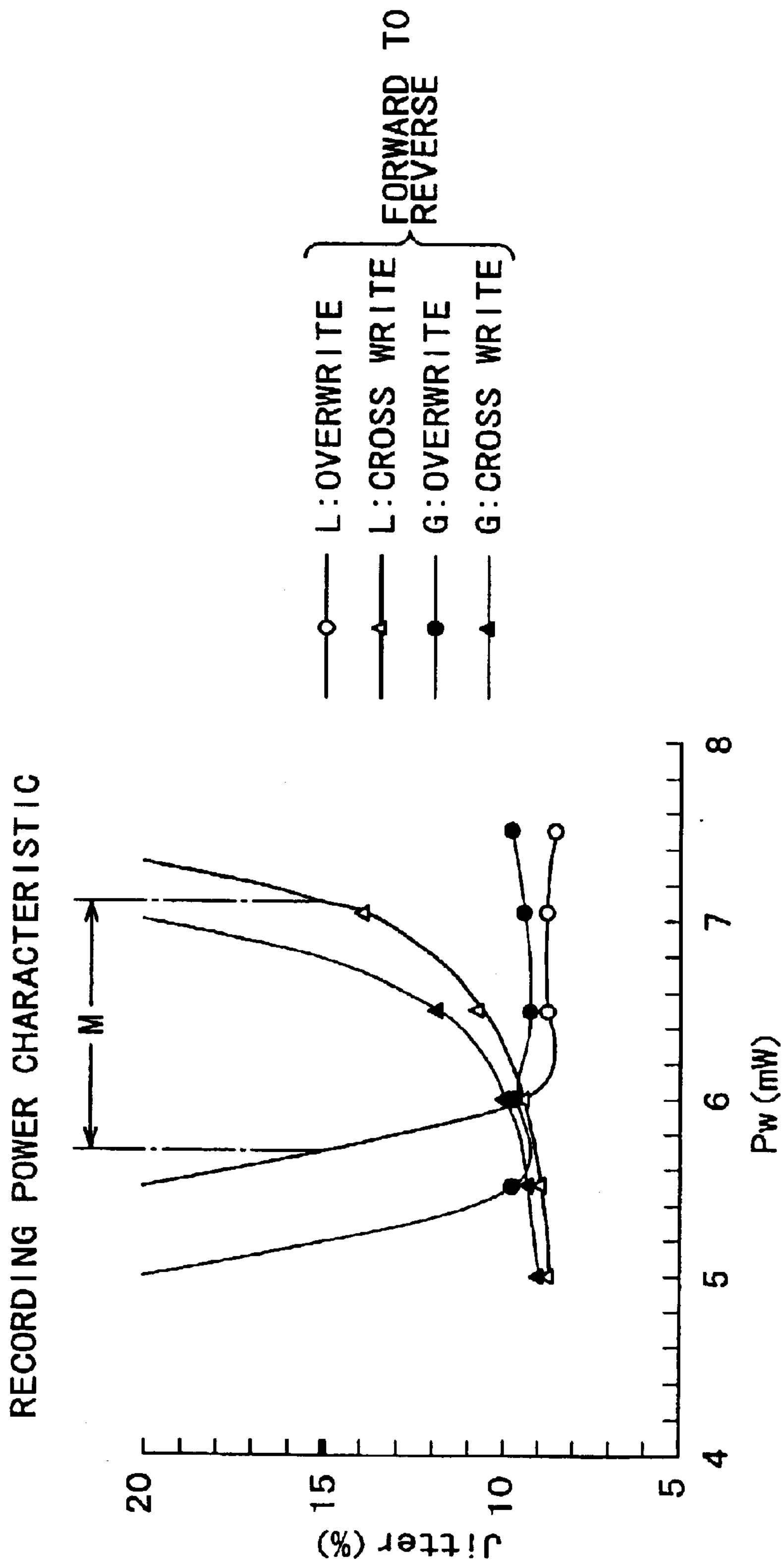
FIG. 6 is another explanatory diagram of relations between control over disc rotating directions on the one hand and the recording power characteristic on the other hand.

The measurements thus taken are shown graphically in FIGS. 5 and 6. In FIG. 5, small hollow circles connected by broken lines represent the measurements taken of the overwrite characteristic on land tracks in "forward to forward" rotation experiments; small hollow triangles connected by broken lines denote the measurements taken of the cross write characteristic on land tracks in "forward to forward" rotation experiments; small solid circles connected by broken lines stand for the measurements taken of the overwrite characteristic on groove tracks in "forward to forward" rotation experiments; and small solid triangles connected by broken lines indicate the measurements taken of the cross write characteristic on groove tracks in "forward to forward" rotation experiments.

In FIG. 6, small hollow circles connected by solid lines represent the measurements taken of the overwrite characteristic on land tracks in "forward to reverse" rotation experiments; small hollow triangles connected by solid lines denote the measurements taken of the cross write characteristic on land tracks in "forward to reverse" rotation experiments; small solid circles connected by solid lines stand for the measurements taken of the overwrite characteristic on groove tracks in "forward to reverse" rotation experiments; and small solid triangles connected by solid lines indicate the measurements taken of the cross write characteristic on groove tracks in "forward to reverse" rotation experiments.

Comparing FIG. 5 with FIG. 6 shows that the jitter levels were reduced across the board in the "forward to reverse" rotation experiments. The allowable range of recording laser power levels is determined by the overwrite characteristic and cross write characteristic. In other words, the allowable range should be such that the overwrite operation is properly performed without affecting the data recorded on adjacent tracks (i.e., no cross write phenomenon taking place). Since the allowable jitter level was set for 15 percent, the margins of recording laser power (around a median) were ±1.5 percent on land tracks in the "forward to forward" rotation experiments. In FIG. 5, the margins are indicated by character M. In the "forward to reverse" rotation experiments, the recording laser power margins proved to be as much as ±10.2 percent, as indicated by M in FIG. 6. This was a considerable expansion of the margins.

The margins of recording laser power on groove tracks were ±10.0 percent in the "forward to forward" rotation experiments as shown in FIG. 5, and ±11.9 percent in the "forward to reverse" rotation experiments as depicted in FIG. 6. Expansions of the margins were also observed here.

The expansions above of the recording laser power margins are attributable in particular to improvements in the cross write characteristic, as illustrated in FIGS. 5 and 6.

The results plotted in FIGS. 5 and 6 indicate that the jitter levels were reduced when the disc rotating direction was reversed between recording and reproduction. It is also shown that the cross write characteristic was improved on both land tracks and groove tracks in the "forward to reverse" rotation experiments. That means data signals on adjacent tracks will not be deleted accidentally when laser power levels are made higher than are conventionally in practice. The margins of recording laser power are thus expanded.

2.4 Characteristics Regarding the Disc Rotating Directions on Land and Groove Tracks In the experiments above, the rotating directions were kept the same on land and groove tracks. That is, the measurements were taken on both land and groove tracks with the recording performed always in the forward rotating direction and with the reproduction in the reverse rotating direction.

Further experiments were conducted by reversing the rotating direction not only between recording and reproduction but also between land tracks and groove tracks. More specifically, measurements were taken of the above-mentioned characteristics in "forward to reverse" rotation experiments on land tracks and in "reverse to forward" rotation experiments on groove tracks (alternatively, in "reverse to forward" rotation experiments on land tracks and "forward to reverse" rotation experiments on groove tracks). The recording and reproduction conditions were kept the same.

The experiments yielded substantially the same results as those plotted by solid lines in FIGS. 3 and 4 and those in FIG. 6. It was thus confirmed that good characteristics were obtained likewise when the disc rotating direction was reversed between land tracks and groove tracks being handled.

2.5 Examination of the Experiments

The results from the experiments above provided the following observations:

The jitter levels were found lower on both land tracks and groove tracks when the rotating direction was reversed between recording and reproduction. This contributed in particular toward improving linear recording density.

The margins of reproduction laser power were expanded when the rotating direction was reversed between recording and reproduction. Furthermore, with the rotating direction reversed, laser power dependencies were reduced and the difference in sensitivity was lowered between land tracks and groove tracks. The effects were particularly noticeable with regard to land tracks.

The cross write characteristic was improved on land tracks and groove tracks and the margins of recording laser power were expanded when the rotating direction was reversed between recording and reproduction.

The same effects were obtained when the rotating directions were switched between land tracks and groove tracks.

On the basis of the above observations, it is judged preferred that the disc be turned in the first rotating direction when data are recorded to land and track grooves and that the disc be turned in the second rotating direction when data are reproduced from land and track grooves.

Alternatively, it is judged desirable that the disc be turned in the first rotating direction when data are recorded to land tracks and reproduced from groove tracks and that the disc be turned in the second rotating direction when data are recorded to groove tracks and reproduced from land tracks.

As another alternative, it is found preferable that the first and the second disc rotating directions be switched between recording and reproduction solely on either the land tracks or the groove tracks. The effects are still the same with the tracks on which the rotating directions are switched.

The probable reasons for the above results are as follows: with the "forward to forward" disc rotations in effect, the wing shape of a domain wall forming a magnetic domain on the track and the shape of a constant-temperature line in the laser spot are circular arc each but convex in the opposite directions. This restricts the force to drive the domain wall. With the "forward to reverse" disc rotations in effect, by contrast, the wing shape and the constant-temperature line shape are convex in the same direction. This considerably boosts the force to drive the domain wall. As a result, even limited cases of accidental data erasure can hamper domain wall displacement leading to faulty signal reproduction with the "forward to forward" disc rotations in effect, while good signal status can be maintained with the "forward to reverse" disc rotations in use. In addition, because the wing shape and the constant-temperature line shape are convex in the same direction with the "forward to reverse" disc rotations in effect, the dispersion of domain wall driving force over time is lessened. That in turn lowers the jitter levels.

Figure 7A:
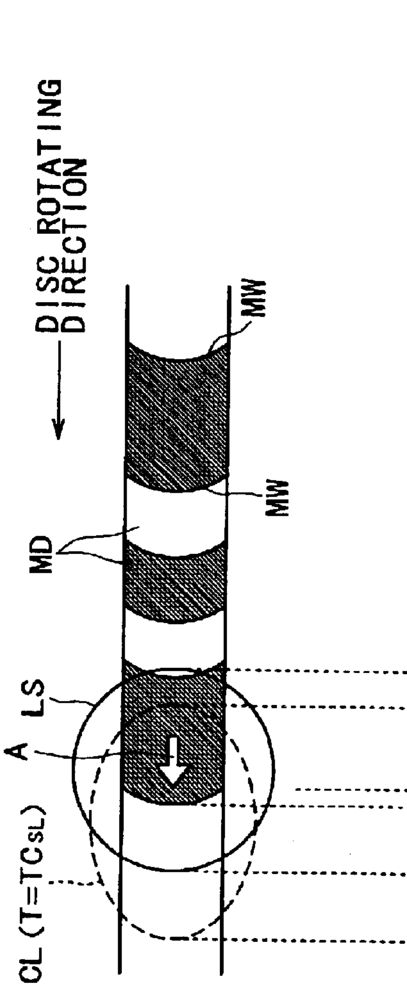
FIGS. 7A, 7B and 7C are explanatory views illustrating the principle of domain wall displacement.
Figure 7B:
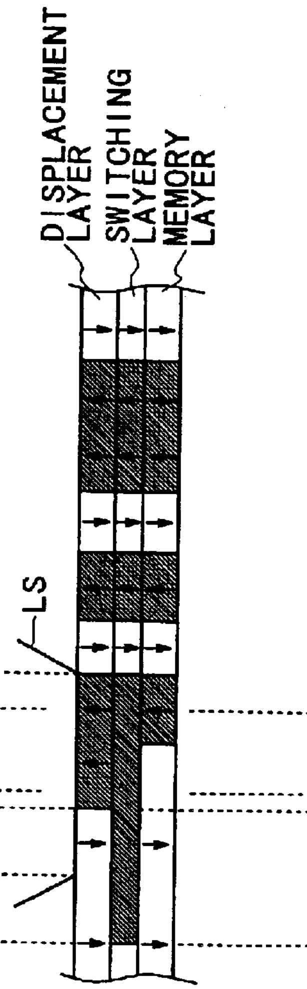
Figure 7C:
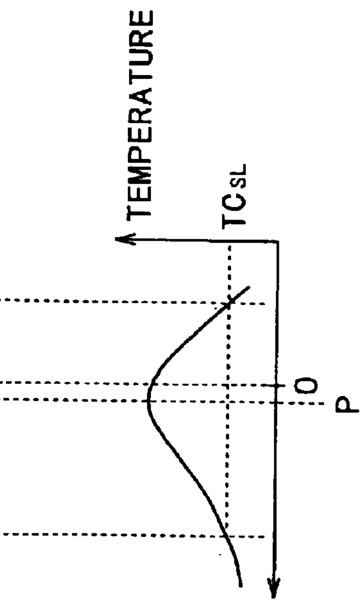

The workings outlined above will now be explained in more detail by referring to FIGS. 7A through 11B. FIGS. 7A, 7B and 7C illustrate the principle of domain wall displacement. The domain wall displacement detection method is a reproducing method that takes advantage of a magnetic film characteristic known as the domain wall displacement phenomenon caused by temperature gradient.

FIG. 7A shows how data are recorded as magnetic domains on a track, and FIG. 7B indicates how magnetic domains occur in the layered direction. As depicted in FIG. 7B, the recording medium is basically composed of three layers: a displacement layer presenting a small domain wall coercive force; a switching layer having a relatively low Curie temperature TcSL; and a memory layer possessing a large domain wall coercive force.

When the recording film surface is locally heated by a laser spot Ls as shown in FIG. 7A, the surface develops a temperature distribution illustrated in FIG. 7C. A broken line CL in FIG. 7A represents a constant-temperature line of the Curie temperature TcSL.

The higher the temperature, the lower the domain wall energy density. For that reason, with the temperature distribution of FIG. 7C in effect, the domain wall energy density is the lowest where the temperature is at a peak P. This produces a force to drive a magnetic wall MW in the direction of the high-temperature side where the energy density is low.

At locations where the medium temperature is lower than the Curie temperature TcSL, a switched connection is formed between the component magnetic layers. As a result, a domain wall driving force induced by temperature gradient does not lead to domain wall displacement, hampered by a larger domain wall coercive force of the memory layer.

On the other hand, at locations where the medium temperature is higher than the Curie temperature TcSL, there is no switched connection between the displacement layer and the memory layer. This allows the magnetic wall MW in the displacement layer having a small domain wall coercive force to be displaced under a domain wall driving force caused by temperature gradient. As a result, the moment the magnetic wall MW enters a disconnected area following scanning of the laser spot SP, the magnetic wall MW in the displacement layer is displaced toward the high-temperature side, as shown by an arrow in FIG. 7A.

Such domain wall displacement takes place every time the location at the temperature TcSL is traversed by each of the magnetic walls MW formed at intervals reflecting recorded signals in the memory layer, in conjunction with the scanning of the laser spot SP. Consequently, when the recording medium is scanned at a constant speed, domain wall displacements occur at time intervals corresponding to the spatial intervals of recorded magnetic walls. Recorded signals are thus reproduced by detecting the domain wall displacements as they occur.

Figure 8A:
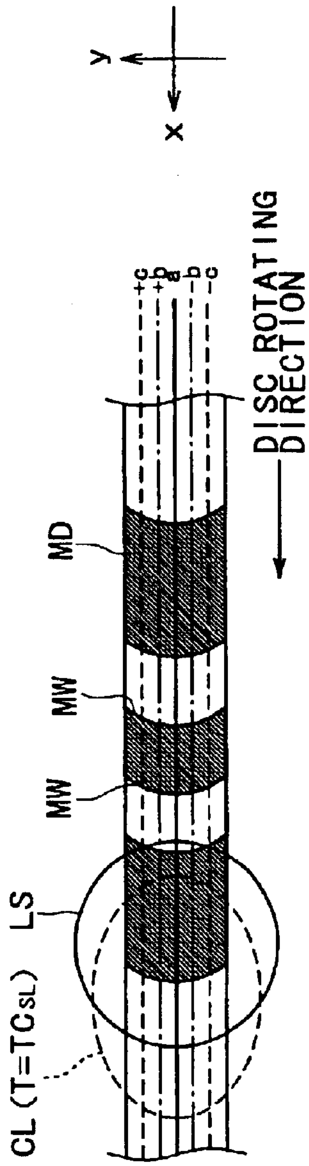
FIGS. 8A, 8B and 8C are explanatory views showing fluctuations of domain wall driving force in the track width direction.
Figure 8B:
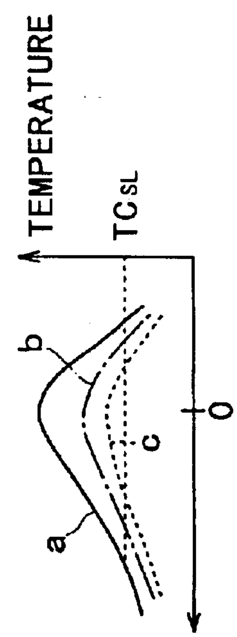
Figure 8C:
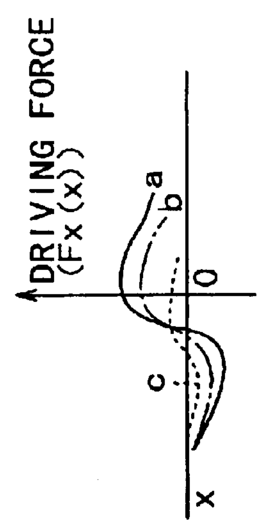

Referring to FIGS. 8A through 8C, consider a domain wall driving force traversing a track ("y" direction in FIG. 8A) where the above-described principle of domain wall displacement is applicable. Suppose that a solid line "a" in FIG. 8A represents a track center and that the laser spot SP scans along the line "a." Two dashed lines "b" are shifted in the "y" direction by distances +b and −b respectively from the track center. Two broken lines "c" are shifted in the "y" direction by distances +c and −c respectively from the track center.

The temperature distribution along the lines "a," "b" (+b, −b) and "c" (+c, −c) typically occurs as shown in FIG. 8B. The temperature is lower the greater the distance from the center line in the "y" direction. The higher the temperature, the lower the domain wall energy density as mentioned earlier. Domain wall displacements take place as a result of the magnetic wall driving force caused by temperature gradient. Under these circumstances and given the temperature distribution of FIG. 8B, the domain wall driving force occurs as illustrated in FIG. 8C. Specifically, the domain wall driving force F is smaller the greater the distance from the track center in the "y" direction.

Figure 9A:
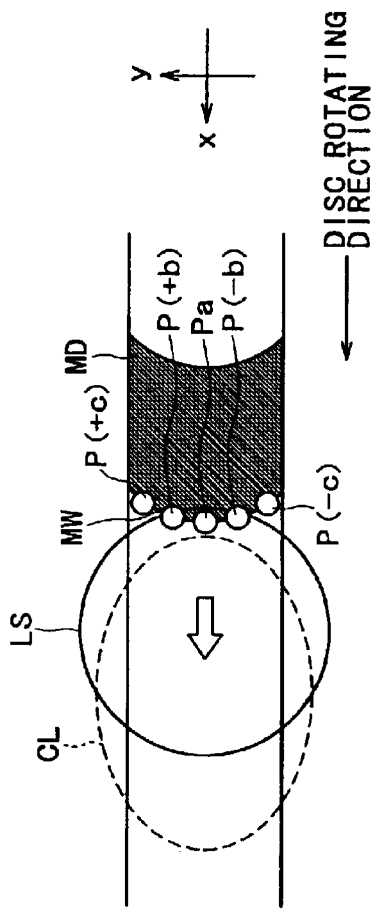
FIGS. 9A and 9B are explanatory views of time differences in domain wall driving force between different disc rotating directions.

Referring to FIGS. 9A through 10B, consider differences of driving force against the magnetic wall MW over time. FIG. 9A shows what takes place in a "forward to forward" (or "reverse to reverse") rotation setup, and FIG. 9B depicts how things go in a "forward to reverse" (or "reverse to forward") rotation setup.

In the "forward to forward" rotation setup of FIG. 9A, the wing shape of a magnetic wall MW forming a magnetic domain MD on the track and the shape of a constant-temperature line CL in the laser spot LS are circular arc each but convex in the opposite directions. In the "forward to reverse" rotation setup of FIG. 9B, the wing shape of the magnetic wall MW forming the magnetic domain MD on the track and the shape of the constant-temperature line CL in the laser spot LS are circular arc each and convex in the same direction.

Figure 9B:
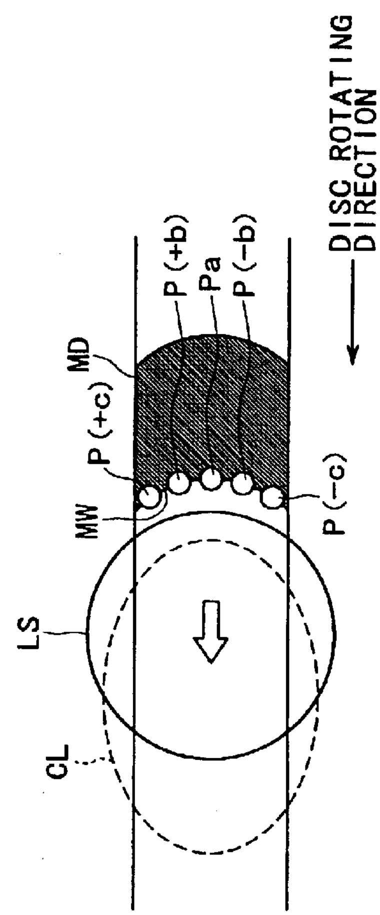

FIGS. 9A and 9B indicate points Pa, P(+b), P(−b), P(+c) and P(−c) on the magnetic wall MW in the "y" direction as they occur respectively on the lines a, +b, −b, +c, and −c in FIG. 8A.

The domain wall driving force is produced in keeping with temperature distribution. In the case of FIG. 9A where the wing shape of the magnetic wall MW and the shape of the constant-temperature line CL are circular arc each but convex in the opposite directions, the driving force is generated earliest at the point Pa of the magnetic wall MW. Later the force occurs at the points P(+b) and P(−b). Thereafter the driving force is produced at the points P(+c) and P(−c).

As discussed above, the driving force is weaker the greater the distance from the center in the "y" direction. For that reason, the driving force varies over time at the points Pa, Pb (P(+b), and P(−b)), Pc (P(+c) and P(−c)) as illustrated in FIG. 10A.

Figure 10A:
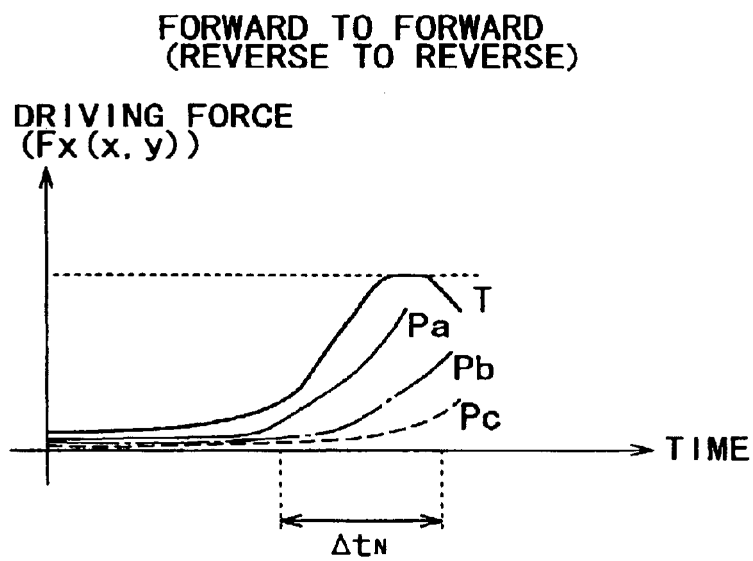
FIGS. 10A and 10B are other explanatory views of time differences in domain wall driving force between different disc rotating directions.

That is, due to the variations in the driving force in the "y" direction over time, the driving force changes at the points Pa, Pb and Pc as plotted by a solid line, a dashed line, and a broken line respectively in FIG. 10A. The total driving force combining the variations is indicated by a solid line T. In the graphic representation of FIG. 10A, the driving force T takes on a relatively blunt curve over a time interval ΔtN, and its peak level is low.

Figure 10B:
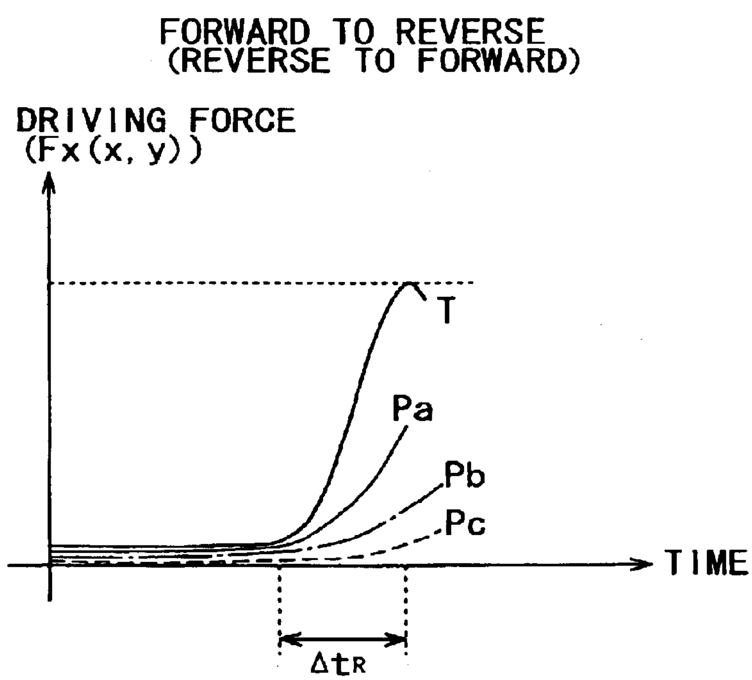

In the case of FIG. 9B where the wing shape of the magnetic wall MW and the shape of the constant-temperature line CL are circular arc each and convex in the same direction, the driving force is generated in the magnetic wall MW approximately at the same time throughout the points Pa, P(+b), P(−b), P(+c), and P(−c) (with very small time intervals between them). In this case, too, the driving force is smaller the greater the distance from the track center in the "y" direction. The driving force varies over time at the points Pa, Pb and Pc as depicted in FIG. 10B.

That is, variations in the driving force do occur in the "y" direction but are almost nonexistent over time. Thus the driving force changes at the points Pa, Pb and Pc as plotted by a solid line, a dashed line, and a broken line respectively in FIG. 10B. The total driving force combining the variations is indicated by a solid line T. In the graphic representation of FIG. 10B, the driving force T takes on an acute curve over a time interval ΔtR, and its peak level is high.

The observations above lead to the following conclusions: whereas the driving force is smaller the greater the distance from the track center in the "y" direction, the total driving force T peaks high in the "forward to reverse" rotation setup. The loss of the driving force caused by its variations in the "y" direction is appreciably smaller in the "forward to reverse" rotation setup than in the "forward to forward" rotation setup. This is the major reason why the cross write characteristic has been improved. In the "forward to reverse" rotation setup, the variations in the driving force over time are found lessened even as the force presents an acute curve T as discussed above. That means a reduction of the jitter levels during reproduction.

The results of the experiments shown in FIG. 3 revealed that the shorter the bit length (i.e., the higher the linear recording density), the greater the effects of the "forward to reverse" rotation setup. How this came about will now be explained with reference to FIGS. 11A and 11B.

Figure 11A:
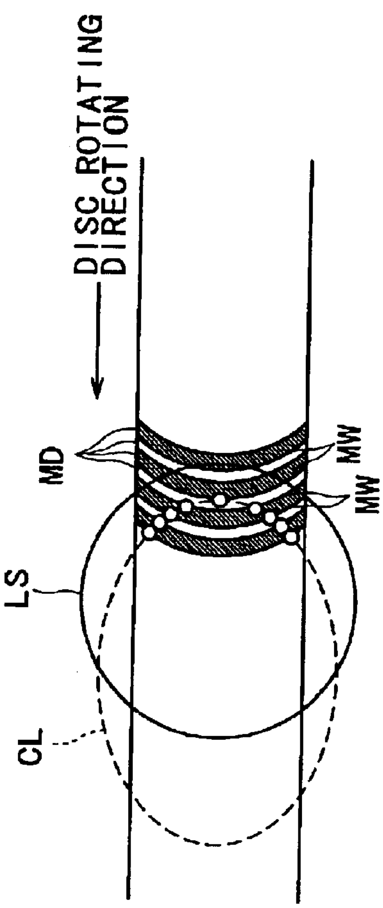
FIGS. 11A and 11B are explanatory views of relations between disc rotating directions on the one hand and linear recording density on the other hand.
Figure 11B:
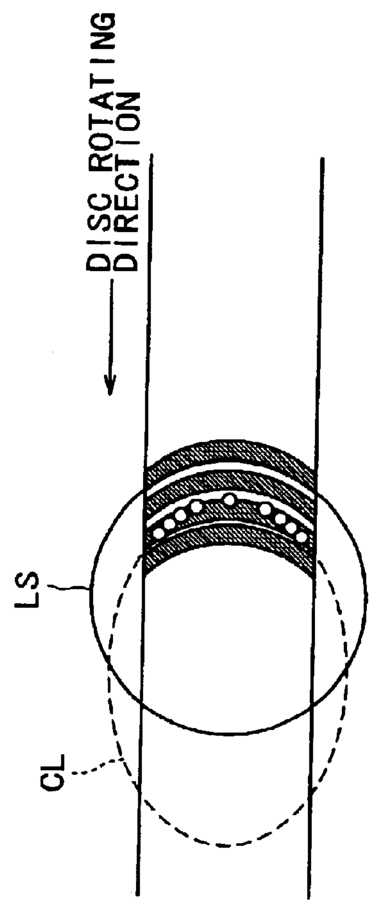

FIG. 11A shows an example of a high linear recording density with the "forward to forward" (or "reverse to reverse") rotation setup in effect, and FIG. 11A depicts an example of a high linear recording density with the "forward to reverse" (or "reverse to forward") rotation setup in effect. In the case of the "forward to forward" rotation setup, as shown in FIG. 11A, a domain wall (encircled by solid line) crossing a constant-temperature line CL extends over magnetic walls MW of a plurality of magnetic domains MD. Where the "forward to reverse" rotation setup is in effect, as indicated in FIG. 11B, the domain wall (encircled by solid line) crossing the constant-temperature line CL constitutes substantially a single magnetic wall MW.

That is, where the "forward to forward" rotation setup is in effect, intersymbol interference adversely affects the detection of domain wall displacement as the linear recording density is raised. On the other hand, with the "forward to reverse" rotation setup in effect, intersymbol interference affects the detection very little. The latter setup is thus conducive to enhanced levels of data resolution affording significantly reduced jitter levels where the linear recording density is high.

3. Embodiments of the Recording/Reproducing Method

FIG. 12 lists various embodiments of the recording/reproducing method according to the invention, the embodiments being derived from the results of the above-described experiments. Illustratively, embodiments 1 through 8b are listed in FIG. 12.

<Embodiment 1>

This is a recording/reproducing method whereby the disc is rotated in the forward direction for recording to land tracks and groove tracks, and in the reverse direction for reproduction from land tracks and groove tracks.

<Embodiment 2>

This is a recording/reproducing method whereby the disc is rotated in the reverse direction for recording to land tracks and groove tracks, and in the forward direction for reproduction from land tracks and groove tracks.

The embodiments 1 and 2 above are the recording/reproducing methods whereby the disc rotating direction is reversed between the recording and the reproduction.

<Embodiment 3>

This is an embodiment whereby the disc is rotated in the forward direction for recording to land tracks and for reproduction from groove tracks, and in the reverse direction for reproduction from land tracks and for recording to groove tracks.

<Embodiment 4>

This is a recording/reproducing method whereby the disc is rotated in the reverse direction for recording to land tracks and for reproduction from groove tracks, and in the forward direction for reproduction from land tracks and for recording to groove tracks.

The embodiments 3 and 4 above are the recording/reproducing methods whereby the disc rotating direction is reversed between the recording and the reproduction as well as between the land tracks and the groove tracks.

<Embodiment 5 (5a, 5b)>

This is a recording/reproducing method whereby the disc is rotated in the forward direction for recording to land tracks, in the reverse direction for reproduction from land tracks, and in the forward (or reverse) direction for recording to and reproduction from groove tracks.

<Embodiment 6 (6a, 6b)>

This is a recording/reproducing method whereby the disc is rotated in the reverse direction for recording to land tracks, in the forward direction for reproduction from land tracks, and in the forward (or reverse) direction for recording to and reproduction from groove tracks.

The embodiments 5 and 6 above are the recording/reproducing methods whereby the disc rotating direction is reversed only on the land tracks between the recording and the reproduction.

<Embodiment 7 (7a, 7b)>

This is a recording/reproducing method whereby the disc is rotated in the forward direction for recording to groove tracks, in the reverse direction for reproduction from groove tracks, and in the forward (or reverse) direction for recording to and reproduction from land tracks.

<Embodiment 8 (8a, 8b)>

This is a recording/reproducing method whereby the disc is rotated in the reverse direction for recording to groove tracks, in the forward direction for reproduction from groove tracks, and in the forward (or reverse) direction for recording to and reproduction from land tracks.

The embodiments 7 and 8 above are the recording/reproducing methods whereby the disc rotating direction is reversed only on the groove tracks between the recording and the reproduction.

Figures 13A, 13B, 13C, 13D:
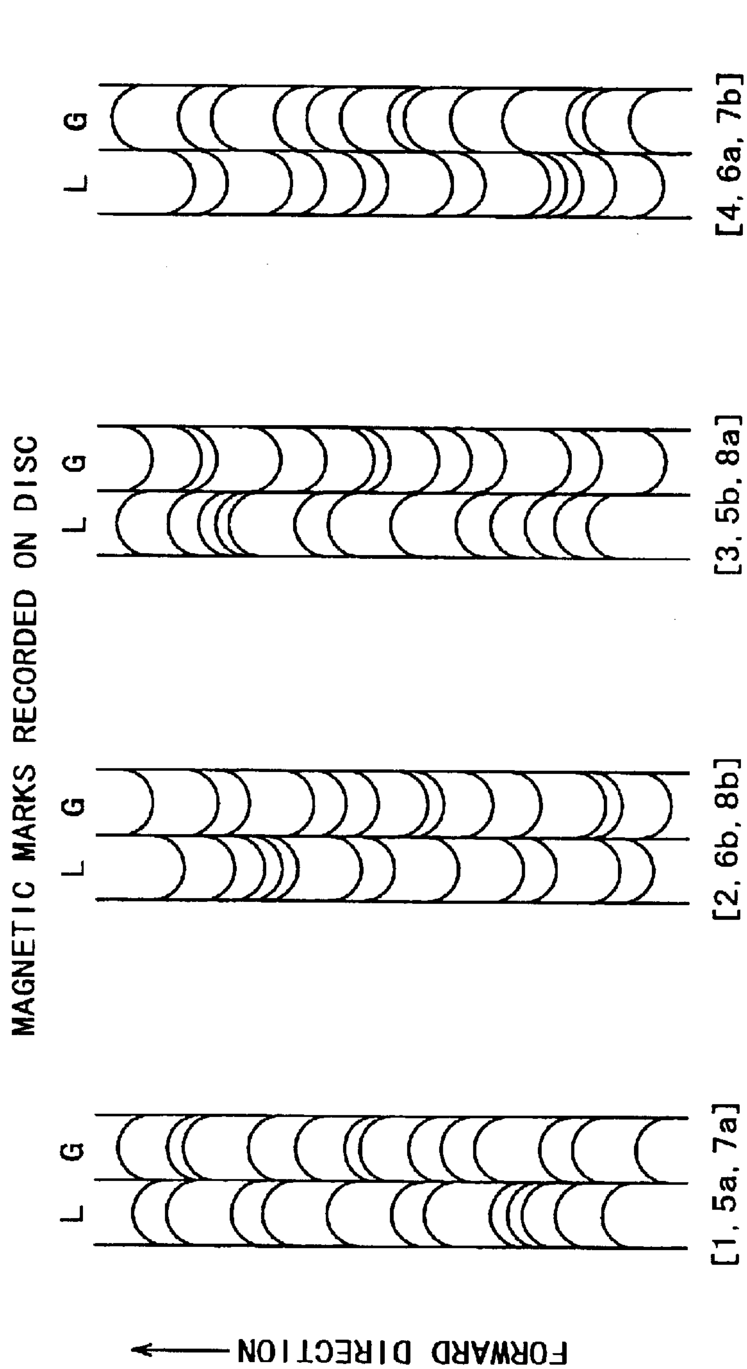
FIGS. 13A, 13B, 13C and 13D are explanatory views showing shapes of magnetic domains along lands and grooves in connection with recording/reproducing methods of the different embodiments.

FIGS. 13A through 13D show the wing shapes of magnetic domains (magnetic walls) recorded to land tracks L and groove tracks G on the disc through the use of the embodiments above. FIG. 13A depicts the magnetic domains shaped by use of the embodiments 1, 5a, and 7a; FIG. 13B illustrates the magnetic domains shaped by the embodiments 2, 6b, and 8b; FIG. 13C indicates the magnetic domains shaped by the embodiments 3, 5b, and 8a; and FIG. 13D sketches the magnetic domains shaped by the embodiments 4, 6a, and 7b.

In the examples of FIGS. 13A and 13B in conjunction with the embodiments 1, 5a, 7a, 2, 6b, and 8b, the disc has the wing shapes of the recorded magnetic domains oriented in the same direction on both the land track L and the groove track G. In the examples of FIGS. 13C and 13D in connection with the embodiments 3, 5b, 8a, 4, 6a, and 7b, the disc has the wing shapes of the recorded magnetic domains oriented in the opposite directions on the land track L and groove track G.

The embodiments 1, 2, 3 and 4 provide the above-described effects by reversing the disc rotating direction between the recording and the reproduction on both the land track and the groove track. The embodiments 5 and 6 provide the same effects by reversing the disc rotating direction on the land track between the recording and the reproduction. The embodiments 7 and 8 provide the effects likewise by reversing the disc rotating direction on the groove track between the recording and the reproduction.

4. Structure of the Recording/Reproducing Apparatus

Figure 14:
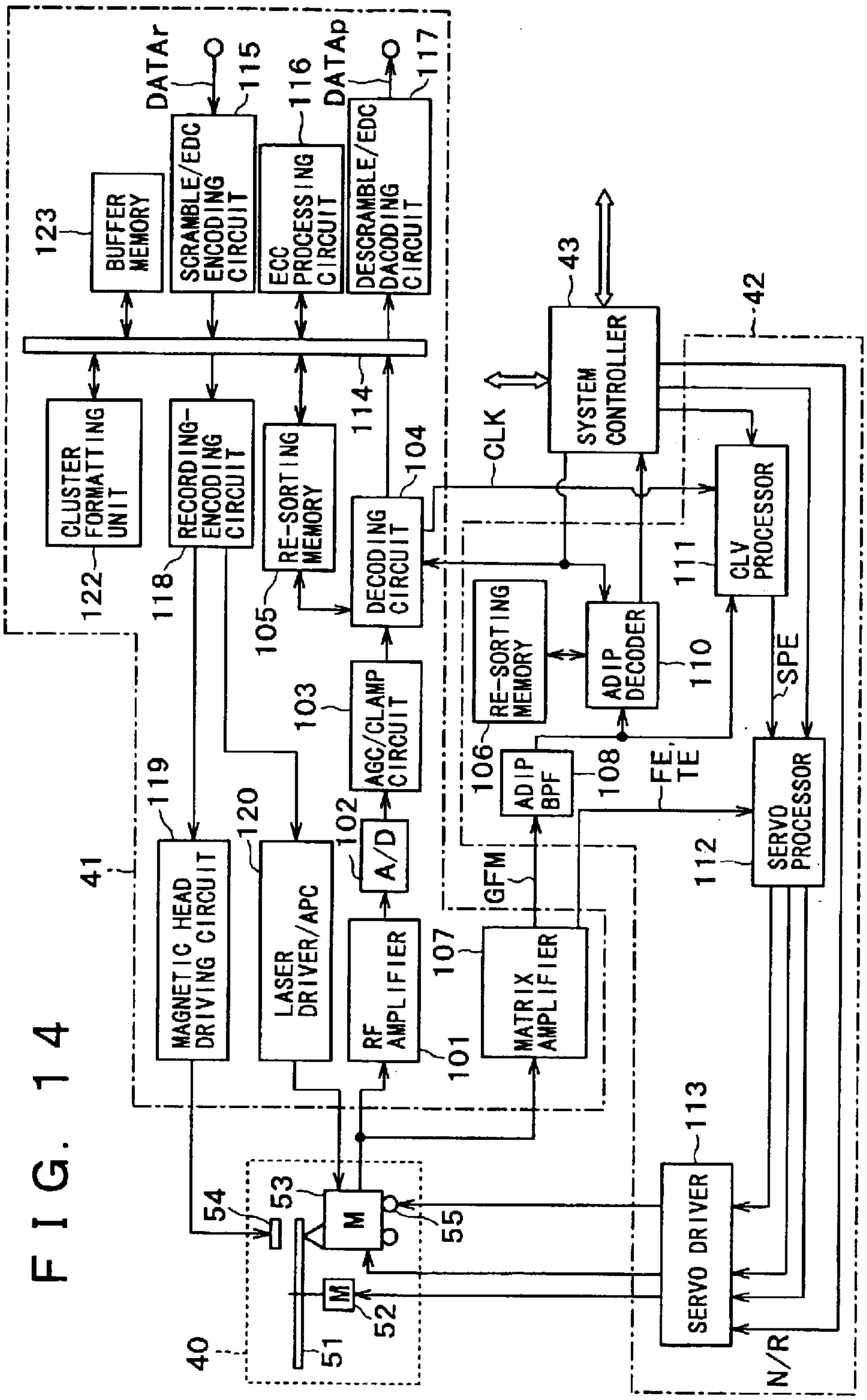
FIG. 14 is a block diagram of a recording/reproducing apparatus embodying the invention.

A typical structure of a recording/reproducing apparatus embodying the invention will now be described. FIG. 14 is a block diagram of the recording/reproducing apparatus according to the invention. This apparatus may illustratively be a disc drive that is connected to (or incorporated in) a personal computer or the like, video equipment such as a video camera, or audio equipment.

The recording/reproducing apparatus is constituted principally by a deck unit 40, a recording/reproduction signal processing unit 41, a servo circuit 42, and a system controller 43.

The deck unit 40 is loaded with a disc 51. This disc 51 has the structure of the above-described domain wall displacement detection medium. The deck unit 40 comprises mechanisms for driving the disc 51. Although not shown, the deck unit 40 is structured so as to let the disc 51 be loaded and unloaded by the user.

The disc 51 loaded into the deck unit 40 is rotated by a spindle motor 52. Upon recording or reproduction to or from the disc 51, an optical head 53 emits a laser beam to the disc surface. The optical head 53 includes an optical system made up of a laser diode arrangement as laser output means, a polarization beam splitter and an objective lens, as well as detectors for detecting reflected light from the disc surface. A dual axis mechanism allows the objective lens of the optical head 53 to move radially over the disc as well as perpendicularly to the disc surface.

A magnetic head 54 is positioned in symmetrically opposed relation to the optical head 53 across the disc 51. In operation, the magnetic head 54 applies a magnetic field modulated by write data to the disc 51.

The deck unit 40 also has a sled mechanism driven by a sled motor 55. The sled mechanism, when thus activated, moves the entire optical head 53 and the magnetic head 54 in the radial direction of the disc.

Upon recording, the recording/reproduction signal processing unit 41 performs appropriate signal processing to supply the magnetic head 54 with a field modulation signal for writing data. At reproduction, the signal processing unit 41 performs signal processing for obtaining reproduced data from what is read from the disc by the optical head 53.

At both recording and reproduction, the servo circuit 42 controls the dual axis mechanism of the optical head 55, sled mechanism, and spindle motor 52. The system controller 43 provides necessary control over relevant components to carry out recording and reproduction operations.

Information detected by the optical head 53 from the disc 51 (i.e., a photoelectric current obtained by a photodetector detecting a reflected laser beam) is sent to an RF amplifier 101 in the recording/reproduction signal processing unit 41. On receiving the detected information, the RF amplifier 101 generates a reproduced RF signal for reproduction. The RF amplifier 101 also performs differential corrections to remove low-frequency component fluctuations specific to the domain wall displacement detection method, as well as low-pass filtering for noise reduction purposes.

The signal processed by the RF amplifier 101 is quantified by an A/D converter 102, whereby a reproduced RF signal in digital form is obtained. The reproduced RF signal is subjected to gain adjustment and clamping processes by an AGC/clamp circuit 103 before being fed to a decoding circuit 104.

The decoding circuit 104 comprises illustratively an equalizer/PLL circuit, a Viterbi decoder, and an RLL (1, 7) demodulation circuit. Also included is a read/write circuit for writing and reading data to and from a re-sorting memory used in a re-sorting process. The re-sorting process is carried out to deal with a data stream being reversed during recording or reproduction by the "forward to reverse" (or "reverse to forward") disc rotation setup. The re-sorting process will be described later in more detail.

In the decoding circuit 104, the equalizer/PLL circuit equalizes the reproduced RF signal that has been input and quantified, and forwards the equalized signal to the Viterbi decoder. The reproduced RF signal thus equalized is also input to a digital PLL circuit whereby a clock signal CLK is extracted in synchronism with the reproduced RF signal (RLL (1, 7) code train).

The frequency of the clock signal CLK corresponds to the current disc rotating speed. Taking advantage of this characteristic, a CLV processor 111 in the servo circuit 42 receives the clock signal CLK from the decoding circuit 104 (i.e., equalizer/PLL circuit), compares the signal with a predetermined reference CLV value to obtain error information, and uses that error information as a signal component for generating a spindle error signal SPE. The clock signal CLK is further utilized by relevant signal processing circuits in their processing, such as the RLL (1, 7) demodulation circuit in the decoding circuit 104.

The Viterbi decoder in the decoding circuit 104 performs a decoding process using the so-called Viterbi algorithm on the reproduced RF signal coming from the equalizer/PLL circuit, whereby reproduced data are obtained as an RLL (1, 7) code train. The reproduced data are input to the RLL (1, 7) demodulation circuit which in turn produces a data stream through RLL (1, 7) demodulation.

In the decoding circuit 104 of this example, the reproduced RF signal quantified by the A/D converter 102 is used for AGC processing, equalizing, and digital PLL processing. However, this is not limitative of the invention. Alternatively, the reproduced RF signal yet to be quantified may be subjected to analog AGC processing, equalizing, and PLL processing upstream of the A/D converter 102.

The data stream derived from demodulation by the RLL (1, 7) demodulation circuit in the decoding circuit 104 is written to and expanded in a buffer memory 123 via a data bus 114. The data stream thus expanded in the buffer memory 123 is subjected first to error correction in units of error-correcting blocks by an ECC processing circuit 116 and then to descrambling and EDC decoding by a descramble/EDC decoding circuit 117. These processes combine to yield reproduced data DATAp. The reproduced data DATAp are sent illustratively from the descramble/EDC decoding circuit 117 to the relevant units or circuits.

The information detected by the optical head 53 from the disc 51 (i.e., as a photoelectric current) is also fed to a matrix amplifier 107. The matrix amplifier 107 carries out necessary processes on the detected information thus input so as to extract a tracking error signal TE, a focus error signal FE, and groove information (absolute addresses recorded by wobbling on tracks of the disc 51) GFM. The tracking error signal TE and focus error signal FE thus extracted are supplied to a servo processor 112 while the groove information GFM is fed to an ADIP band-pass filter 108.

The groove information GFM extracted as wobble components through band-pass filtering by the ADIP band-pass filter 108 is sent to an ADIP decoder 110 and the CLV processor 111. The ADIP decoder 110 decodes the input groove information GFM, extracts therefrom an ADIP signal as absolute address information about the disc, and outputs the ADIP signal to a system controller 43. Given the ADIP signal, the system controller 43 carries out predetermined control processes.

For recording or reproduction in the "forward to reverse" (or "reverse to forward") disc rotation setup, the tracks are traced in the reverse direction during reproduction or recording. In that case, ADIP information recorded by wobbling in the grooves is read in the reverse direction as well. The ADIP information then needs to be re-sorted by use of a re-sorting memory 106. The ADIP decoder 110 first writes the ADIP signal to the re-sorting memory 106 and then reads the signal in reverse from the memory 106 to acquire information in the original ADIP address values.

The CLV processor 111 receives the clock signal CLK from the equalizer/PLL circuit in the decoding circuit 104 as well as the groove information GFM past the ADIP band-pass filter 108. The CLV processor 111 generates a spindle error signal SPE for CLV servo control illustratively by integrating a phase error of the groove information GFM with respect to the clock signal CLK, and outputs the generated spindle error signal SPE to the servo processor 112. The workings of the CLV processor 111 are controlled by the system controller 43.

The servo processor 112 generates various servo control signals (e.g., tracking control signal, focus control signal, sled control signal, and spindle control signal) based on the tracking error signal TE, focus error signal FE and spindle error signal SPE thus input, as well as on a track jump command and an access command from the system controller 43. The generated servo control signals are output to a servo driver 113. These control signals are generated by subjecting the servo error signals and the commands to appropriate processes such as phase compensation, gain control, and set-point control.

The servo driver 113 generates servo drive signals based on the servo control signals supplied by the servo processor 112. The servo drive signals include two dual-axis drive signals for driving the dual axis mechanism (one signal for the focusing direction, the other for the tracking direction), a sled motor driving signal for driving the sled mechanism, and a spindle motor driving signal for driving the spindle motor 52. These servo drive signals are fed to the deck unit 40 which in turn provides focusing and tracking control on the disc 51 as well as CLV control over the spindle motor 52.

In this example, the disc 51 is rotated either in the forward direction or in the reverse direction. The system controller 43 supplies the servo driver 113 with a control signal N/R for designating the forward or reverse disc rotation to be executed. Given the control signal N/R, the servo driver 113 changes the rotating direction of the spindle motor 52 accordingly.

Illustratively, if the embodiment 1 in FIG. 12 is adopted, then the system controller 43 designates the forward rotating direction for recording and the reverse rotating direction for reproduction. If the embodiment 3 in FIG. 12 is adopted, then the system controller 43 specifies the forward rotating direction for recording to land tracks and for reproduction from groove tracks, and the reverse rotating direction for reproduction from land tracks and for recording to groove tracks.

In the "forward to reverse" (or "reverse to forward") rotation setup for recording and reproduction, it is necessary to re-sort data by use of the decoding circuit 104 and ADIP decoder 110. In such cases, the system controller 43 feeds a control signal SC to the decoding circuit 104 and ADIP decoder 110 to specify whether or not to carry out the re-sorting process.

At the time of recording to the disc 51, write data DATAr are input to a scramble/EDC encoding circuit 115 illustratively from an external apparatus or some other circuitry. The scramble/EDC encoding circuit 115 writes the data DATAr illustratively to the buffer memory 123 for data expansion, data scrambling, and EDC encoding (i.e., addition of error-detecting code by a suitable scheme). After the processing, error-correcting code is attached to the write data DATAr in the buffer memory 123 illustratively by the ECC processing circuit 116.

As will be discussed later, a cluster formatting unit 122 performs an appropriate formatting process to deal with the recording and reproduction in the "forward to reverse" (or "reverse to forward") rotation setup of this example. Illustratively, the cluster formatting unit 122 generates data units each called a cluster and serving as an ECC error-correcting block unit. In this case, header data are added to the clusters to let the beginning of each cluster be identified even if the data stream is reversed between the recording and the reproduction. The header data are made of a bit string that remains the same in sequence in both the forward direction and the reverse direction within the data stream.

How reproduced data are re-sorted will be discussed later with reference to FIG. 15. In that case, the data stream will be re-sorted one cluster at a time by the decoding circuit 104 during reproduction. Alternatively, write data may be re-sorted when recorded so as to eliminate the need for a re-sorting process upon reproduction, as will be explained later with reference to FIG. 20. In this case, the data stream scrambled and encoded in ECC will be re-sorted by the cluster formatting unit 122 using a re-sorting memory 105 in carrying out a cluster formatting process.

The write data DATAr processed so far are read from the buffer memory 123 and sent to a recording-encoding circuit 118 over the data bus 114. The recording-encoding circuit 118 subjects the input write data DATAr to RLL (1, 7) modulation to acquire the write data as an RLL (1, 7) code train. The code train is output to a magnetic head driving circuit 119.

The magnetic head driving circuit 119 causes the magnetic head 54 to apply to the disc 51 a magnetic field modulated in accordance with the input write data. The recording-encoding circuit 118 supplies a laser driver/APC 120 with a clock signal in synchronism with the write data. Given the clock signal, the laser driver/APC 120 drives the laser diode in the optical head 53 in a manner emitting to the disc 51 laser pulses in synchronism with the write data generated as magnetic fields by the magnetic head 54. At this point, the laser pulses emitted by the laser diode are kept at a laser power level suitable for the recording. This is how the recording operation takes places illustratively under the laser strobe field modulation scheme.

In addition to causing the laser diode to emit the laser beam for reproduction or recording as mentioned above, the laser driver/APC 120 performs so-called APC (automatic laser power control). The optical head 53 incorporates a detector, not shown, for monitoring the laser power level. A monitor signal from the detector is fed back to the laser driver/APC 120. In turn, the laser driver/APC 120 compares the current laser power level obtained as the monitor signal with a currently established laser power set-point, and causes the laser driving signal to reflect the difference derived from the comparison. This allows the laser power output from the laser diode to remain stable at the current set-point.

Reproduction laser power set-points and recording laser point set-points are set in advance to a register in the laser driver/APC 120 by the system controller 43. Since this example works as a land and groove recording setup, the laser driver/APC 120 retains in its register a number of set-points: a reproduction laser power set-point and a recording laser power set-point for groove tracks, as well as a reproduction laser power set-point and a recording laser power set-point for land tracks.

5. Data Processing for Recording and Reproduction

FIG. 15 is a flowchart of data processing steps carried out by the above-described recording/reproducing apparatus for recording and reproduction in the "forward to reverse" (or "reverse to forward") disc rotation setup. In performing the recording as shown in FIG. 15, the system controller 43 first causes the servo driver 113 to rotate the disc 51 illustratively in the forward direction. In carrying out the reproduction, the system controller 43 causes the servo driver 113 to rotate the disc 51 illustratively in the reverse direction. The system controller 43 further prompts the decoding circuit 104 and ADIP decoder 110 to execute a data stream re-sorting process.

The data processing procedure for recording data is made up of steps S1 through S6 in FIG. 15. In step S1, write data DATAr are input. In step S2, the write data DATAr are scrambled and encoded in EDC (error-detecting code). In step S3, the data are encoded in ECC (error-correcting code) whereby ECC is added. In step S4, a cluster formatting process is carried out on the data so as to form clusters of an ECC block each as a unit. In step S5, the data are encoded illustratively through RLL (1, 7) modulation preparatory to recording. In step S6, the magnetic head 54 records the data by applying to the disc surface a magnetic field modulated in keeping with the RLL (1, 7) modulated data.

The data thus recorded are reproduced by the data reproduction procedure composed of steps S11 through S16 in FIG. 15. In step S11, information is read from the disc by the optical head 53 and quantified before being buffered by the decoding circuit 104 into the re-sorting memory 105 one cluster at a time. In step S12, the buffered data are read in the direction reverse to that in which the data were written earlier, whereby the stream data are re-sorted. This step is needed in view of the fact that the disc rotating direction is reversed between recording and reproduction. In step S13, the re-sorted data are decoded illustratively through Viterbi decoding and RLL (1, 7) demodulation. In step S14, the decoded data are corrected in an ECC error correction process. In step S15, the data are decoded in EDC and descrambled. In step S16, the descrambled data are output as reproduced data DATAp.

In the data processing steps for recording and reproduction, the cluster formatting process in step S4 and the re-sorting processes in steps S11 and S12 vary depending on the disc rotating direction being switched from forward to reverse or vice versa.

Figure 16:
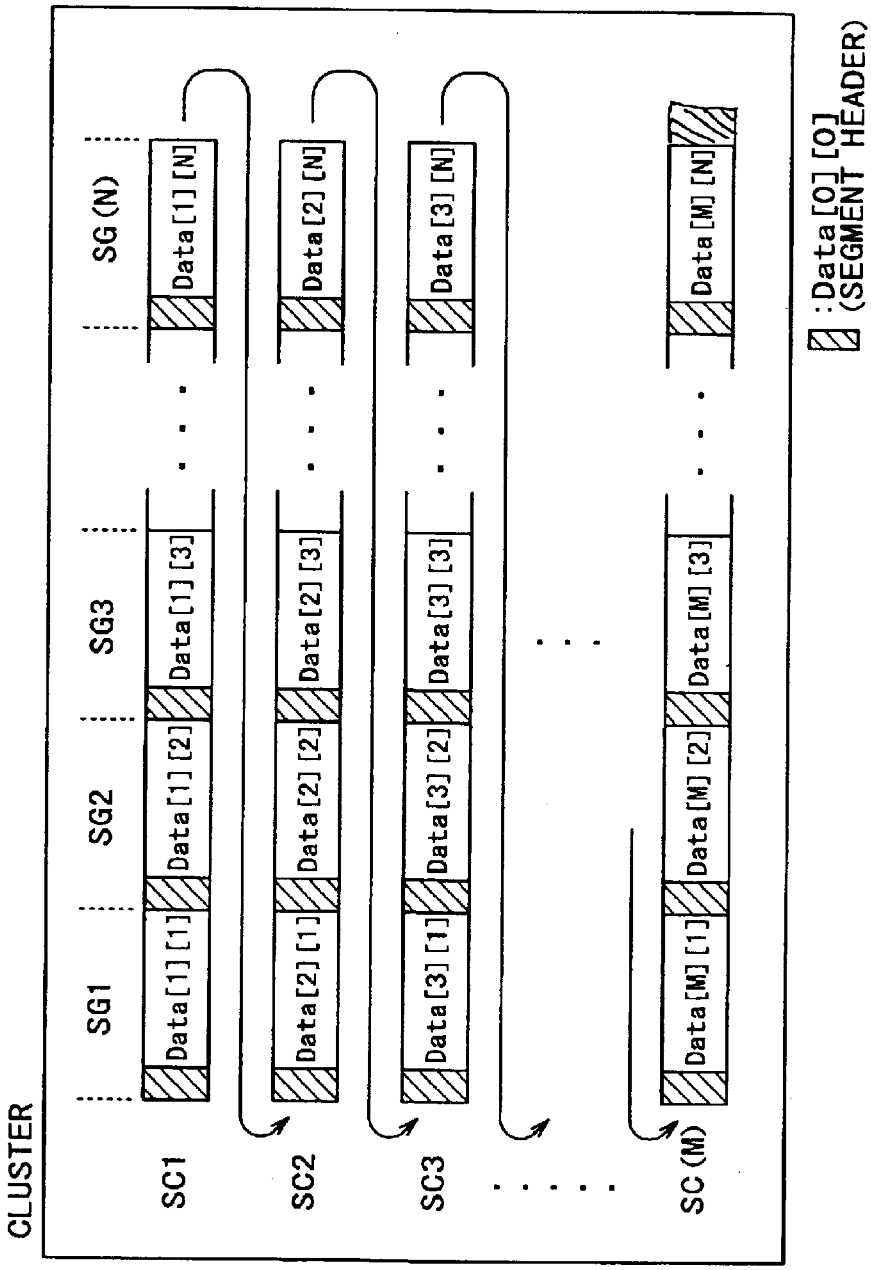
FIG. 16 is an explanatory view of a cluster structure according to the invention.

The cluster formatting process in step S4 is explained in more detail below. FIG. 16 is an explanatory view of a cluster structure created by the cluster formatting unit 122. One cluster is made up of M sectors SC1 through SC(M). One sector is constituted by N segments SG1 through SG(N). Each segment SG is composed of segment header data ([0][0]) and data ([x][y]). In the data format [x][y], [x] stands for a sector number and [y] for a segment number. That means one cluster has data [1][1] through [M][N].

The segment header data [0][0] have an 18T-long, 2T mark/space structure such as "110011001100110011." It should be noted that the data string "110011001100110011" remains the same when read in the forward or reverse direction (i.e., even when MSB and LSB are switched). This is only one segment header example and any other suitable data string may be conceived and adopted. The data [x][y] are expressed as a binary-notation data stream of 0s and 1s which are 16T long. It is not allowed to employ any 2T-repeat patterns for the data stream.

Figure 17:
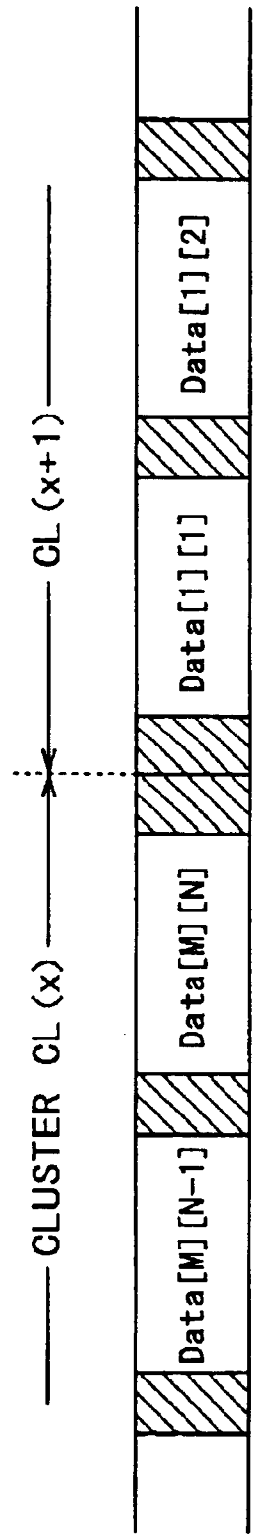
FIG. 17 is an explanatory view of cluster boundaries in a data stream according to the invention.

The data stream in the form of a cluster starts with segment data [x][y] headed by a segment header (data [0][0]) acting as a trigger, and ends with segment data [M][N] suffixed with a segment header (data [0][0]) serving as a termination. Thus from a cluster (CL) stream point of view, the boundary between two clusters has two segment headers (data [0][0]) in a row as shown in FIG. 17. At the time of data reproduction, the two consecutive segment headers are recognized as a pattern indicative of the beginning of a cluster. In the "forward to reverse" disc rotation setup, the data stream is reversed in sequence between recording and reproduction. However, even in the reversed data stream, the segment header data ([0][0]) are composed of the same data string "110011001100110011" which permits the beginning of a cluster and a segment to be recognized correctly upon reproduction.

The amount of data ranging from [1][1] to [M][N] equals an ECC block ready for ECC processing. That is, the cluster formatting unit 122 performs a cluster formatting process on the data block that is held in the buffer memory 123 after undergoing the ECC encoding process by the ECC processing circuit 116 in step S3 of FIG. 15. The cluster formatting unit 122 generates a cluster CL such as one shown in FIG. 16. This cluster is retained in the buffer memory 123. The data stream having undergone the cluster formatting process above is encoded in step S5 for recording.

Figure 18:
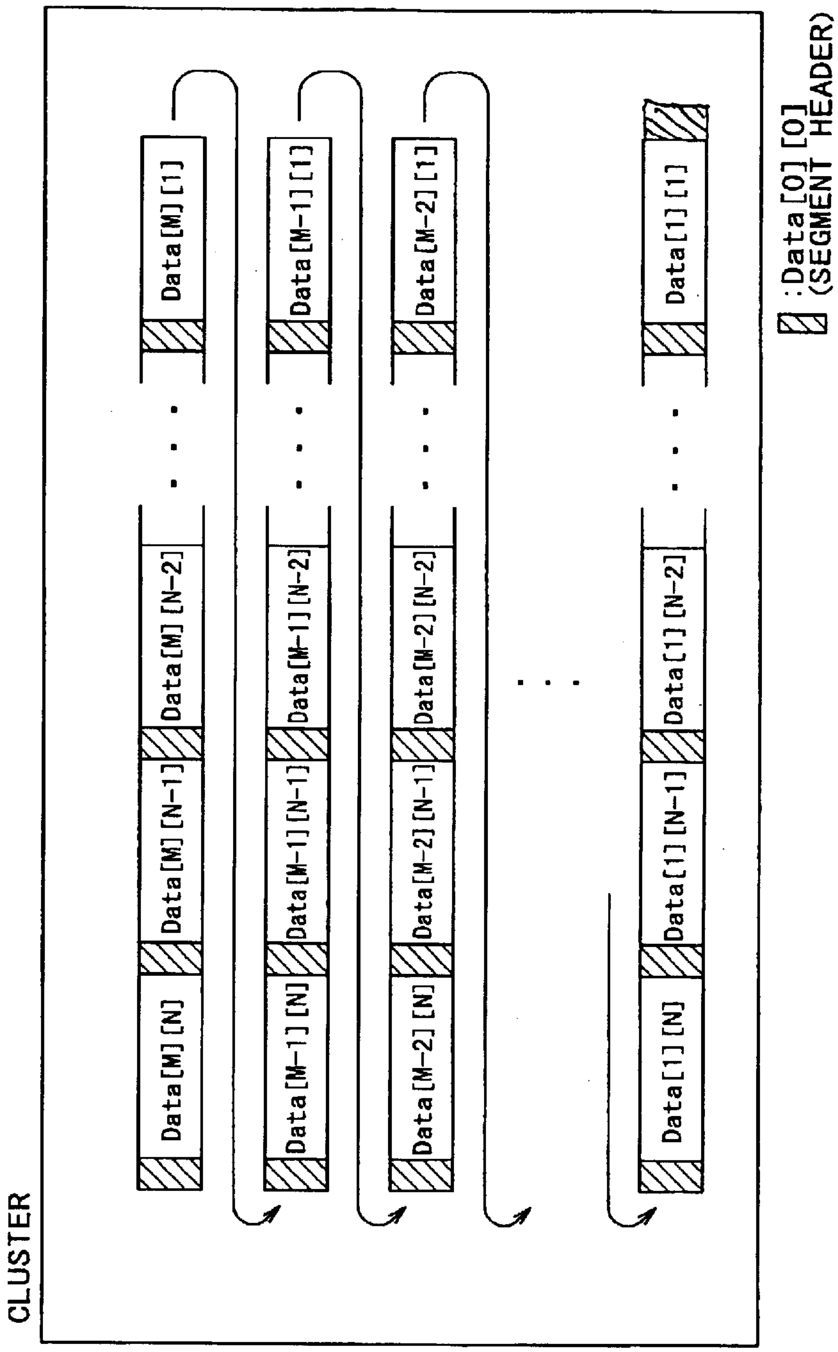
FIG. 18 is an explanatory view of cluster data in a reversed data sequence according to the invention.
Figure 19:
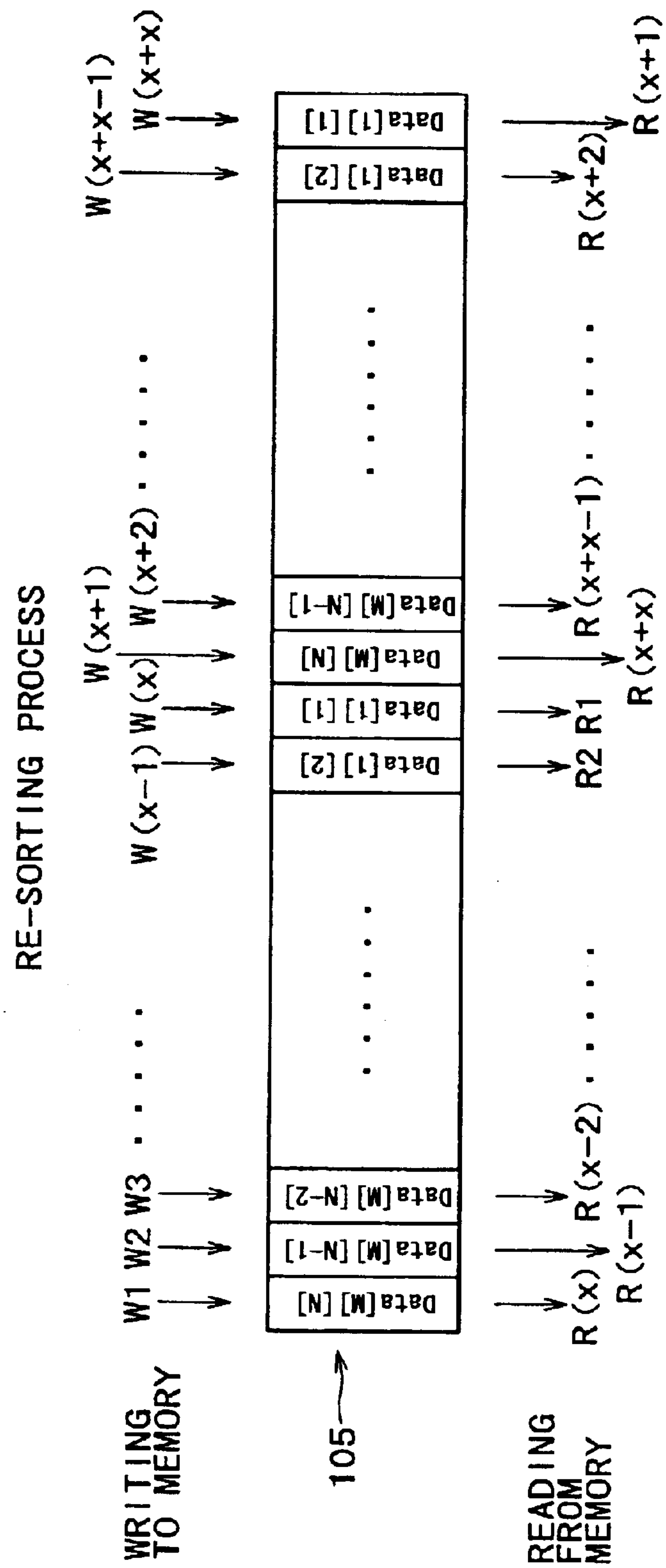
FIG. 19 is an explanatory view of cluster switching according to the invention.

The cluster (CL) stream read for reproduction in the "forward to reverse" disc rotation setup is reversed in sequence, as depicted in FIG. 18. Earlier, the data were recorded in the sequence of data [1][1], data [1][2], data [1][3], . . . , data [M][N], whereas the data are read for reproduction in the order of data [M][N], data [M][N−1], data [M][N−2], . . . , data [1][1] as shown in FIG. 18. That cluster stream is re-sorted in steps S11 and S12 of FIG. 15. FIG. 19 schematically shows how a typical re-sorting process takes place.

As shown in FIG. 19, the decoding circuit 104 writes into the re-sorting memory 105 the retrieved data in the sequence of W1, W2, W3, . . . , W(x−1), and W(x). In other words, the data [M][N] are written first and the data [1][1] last. This completes the writing of one cluster of data. Then the data of the next cluster are written in the sequence of W(x+1), W(x+2), . . . , W(x+x), i.e., ranging from the data [M][N] to the data [1][1] in that order.

Meanwhile, when the write operation has reached W(x), the written data are read in the order of R1, R2, R3, . . . , R(x−1) and R(x). The data stream thus read takes on the sequence of data [1][1], data [1][2], data [1][3], . . . , data [M][N]. The decoding circuit 104 subjects the data stream re-sorted in this manner to such decoding processes as Viterbi decoding and RLL (1, 7) demodulation. The reading of data from the re-sorting memory 105 by the decoding circuit 104 continues in the order of R(x+1), R(x+2), . . . , R(x+x), followed by a decoding process of the next cluster.

Thereafter, the writing of data W1, . . . , W(x+x) and the reading of data R1, . . . R(x+x) are repeated so as to re-sort and decode the data in units of clusters. The decoded data are accumulated in the buffer memory 123 preparatory to step S14 and subsequent steps.

As a reference for triggering the re-sorting process on the data stream, the decoding circuit 104 utilizes the segment header (data [0][0]) as described above. Alternatively, a suitable pit or an appropriate address recorded in a wobbling groove on the disc 51 may be used as the trigger.

The re-sorting process performed in steps S11 and S12 above applies within each cluster and does not involve re-sorting consecutive clusters. In practice, data must be re-sorted in increments of clusters subsequent to step S14 or where the reproduced data are output.

Illustratively, the data having undergone ECC error correction may be retained in units of clusters in the buffer memory 123 provided the memory 123 has a sufficiency capacity and that the total amount of data to be read is relatively small. Once the clusters (ECC blocks) have been put through the error correction, the data may be processed by the descramble/EDC decoding circuit 117 starting with the last-processed ECC block and ending with the initially processed ECC block. As another alternative, if the recording/reproducing apparatus is used in connection with a personal computer or the like, the reproduced data may be re-sorted in units of ECC blocks on a hard disc drive (HDD) of the personal computer.

Figure 20:
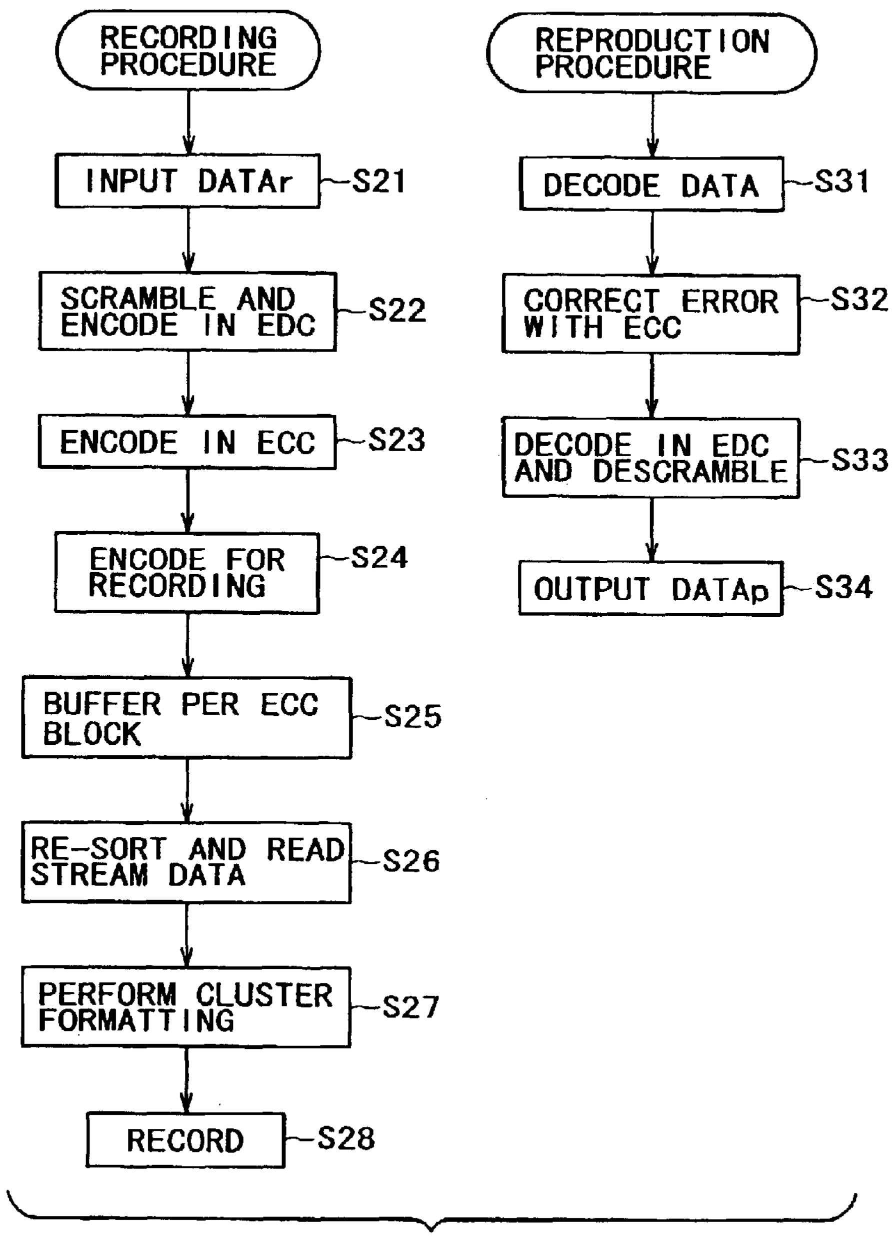
FIG. 20 is another flowchart of recording and reproducing steps embodying the invention.

Other data processing steps will now be described. Where the "forward to reverse" (or "reverse to forward") disc rotation setup is in effect, the recording/reproducing apparatus may carry out the steps in FIG. 20 for data recording and reproduction. In performing the recording as shown in FIG. 20, the system controller 43 first causes the servo driver 113 to rotate the disc 51 illustratively in the forward direction. In carrying out the reproduction, the system controller 43 causes the servo driver 113 to rotate the disc 51 illustratively in the reverse direction. The system controller 43 further prompts the decoding circuit 104 and ADIP decoder 110 to execute the data stream re-sorting process, as in the case of the steps in FIG. 15 above.

In FIG. 20, the data processing procedure for recording data is made up of steps S21 through S28. In step S21, write data DATAr are input. In step S22, the write data DATAr are scrambled and encoded in EDC. In step S23, the data are encoded in ECC (error-correcting code) whereby ECC is added. In step S24, the data are encoded illustratively through RLL (1, 7) modulation preparatory to recording. The encoded data are returned temporarily to the buffer memory 123 for a re-sorting process that is carried out one cluster (i.e., ECC block) at a time. In step S25, the data in the buffer memory 123 are written to the re-sorting memory 105 one ECC block at a time. In step S26, the data are read from the memory 105 in the direction reverse to that in which the data were written earlier, whereby the stream data are re-sorted. Specifically, the process shown schematically in FIG. 19 is performed so as to reverse the data stream sequence in units of ECC blocks. In step S27, the cluster formatting unit 122 performs the cluster formatting process of FIG. 16 on the ECC block-unit data thus reversed in sequence. The data stream (i.e., data encoded through RLL (1, 7) modulation for recording) is supplied to the magnetic head driving circuit 119. In step S28, the magnetic head 54 records the data by applying to the disc surface a magnetic field modulated in keeping with the RLL (1, 7) modulated data.

The data thus recorded are reproduced by the data reproduction procedure composed of steps S31 through S34 in FIG. 20. In step S31, information is read from the disc by the optical head 53 and quantified before being decoded by the decoding circuit 104 through Viterbi decoding and RLL (1, 7) demodulation. In step S32, the decoded data are subjected to ECC error correction. In step S33, the data are decoded in EDC and descrambled. In step S34, the descrambled data are output as reproduced data DATAp.

In the preceding example, the data stream is reversed in sequence in units of clusters at the time of recording. Upon reproduction, the retrieved cluster data such as those shown in FIG. 18 take on the sequence reverse to that in which the data were recorded earlier. Thus the decoding circuit 104 need only proceed with its normal decoding process without becoming aware of the data stream direction currently in effect. In this case, the decoding circuit 104 can also recognize cluster and segment locations by checking the segment headers.

Through execution of the recording and reproducing steps in FIG. 15 or 20, information signals are correctly recorded and reproduced in the "forward to reverse" (or "reverse to forward") disc rotation setup. These steps are adopted advantageously in recording and reproducing data at high density while taking advantage of the above-described benefits such as reduced jitter levels and expanded laser power margins derived from the "forward to reverse" (or "reverse to forward") disc rotating directions implemented for the recording and reproduction.

6. Alternate Land and Groove Recording and Reproduction 6.1 Processing for Recording to Land Tracks As discussed above, FIG. 12 lists various recording/reproducing methods as different embodiments of the invention. In particular, the embodiments 3 and 4 are shown reversing the disc rotating direction between recording and reproduction as well as between lands and grooves being dealt with. These recording/reproducing methods, if implemented, carry out data recording and reproduction efficiently because they alternate between recording to lands and reproduction from grooves or vice versa without switching the disc rotating direction in between. The steps involved are described below, with the recording/reproducing method of the embodiment 3 assumed to be in use.

Figure 21:
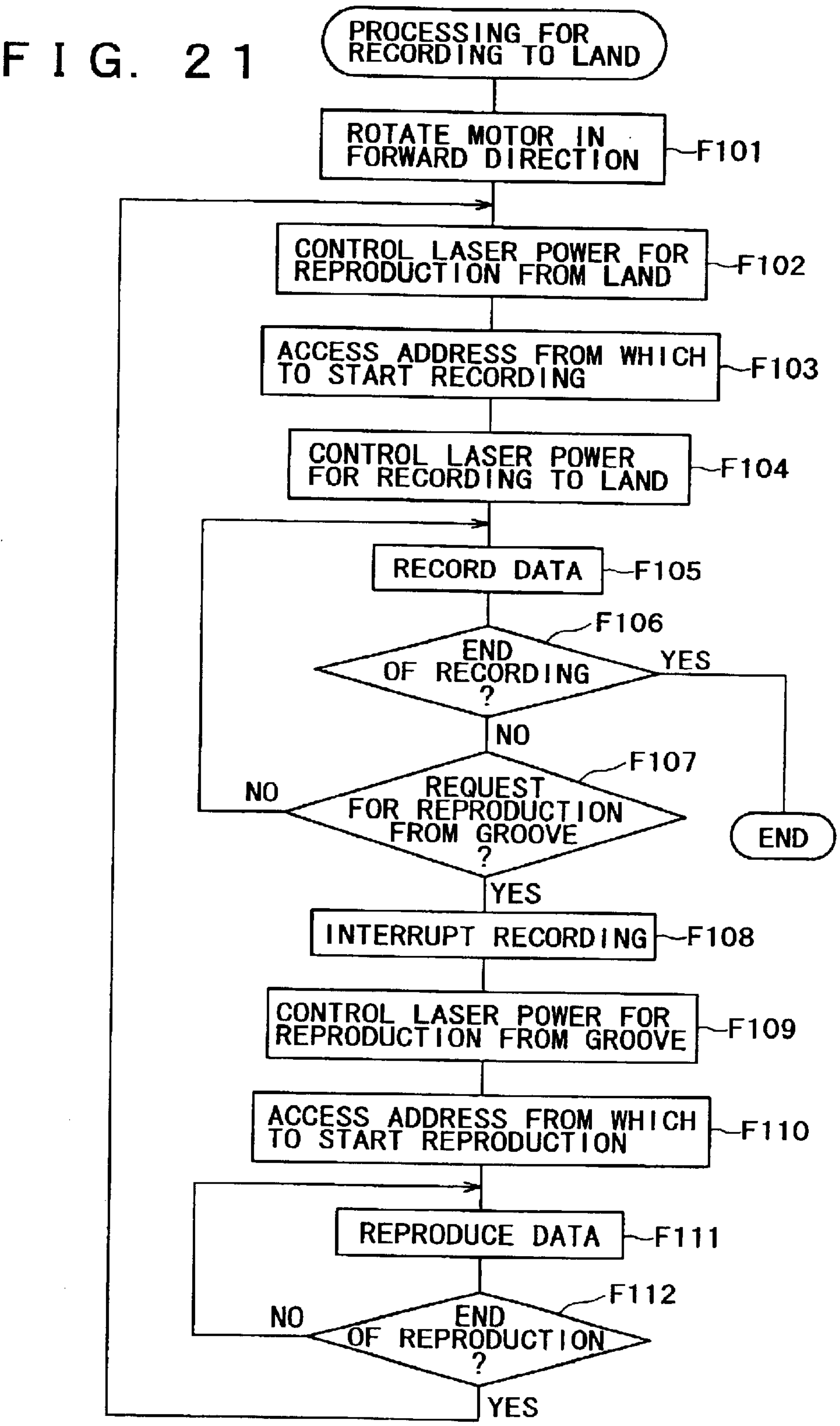
FIG. 21 is a flowchart of steps for recording to lands according to the invention.

FIG. 21 is a flowchart of steps that may be performed by the system controller 43 for recording data to lands. At the time of recording to land tracks, the system controller 43 first causes the spindle motor 52 to rotate in the forward direction in step F101. In step F102, the system controller 43 orders the laser driver/APC circuit 120 to generate laser power for data reproduction from land tracks. In step F103, the system controller 43 controls the servo processor 112 so that the latter will cause the optical head 53 and magnetic head 54 to access a suitable land track address from which to start recording.

Following the access, the system controller 43 reaches step F104 and orders the laser driver/APC circuit 120 to generate laser power for writing data to land tracks. In step F105, the system controller 43 causes the relevant components (recording/reproduction signal processing unit 41, deck unit 40, servo circuit 42) to start recording data.

In step F106, a check is made to see if the recording has ended. If the end of recording is detected, the processing is terminated. During recording, a request may occur (in step F107) for data reproduction from a groove track. In that case, step F107 is followed by step F108 in which the system controller 43 orders the recording/reproduction signal processing unit 41 to interrupt its recording process. In step F109, the system controller 43 orders the laser driver/APC circuit 120 to generate laser power for reproducing data from groove tracks. In step F110, the system controller 43 causes the optical head 53 and magnetic head 54 to access an appropriate groove track address from which to start reproduction. Upon completion of the access, the system controller 43 reaches step F111 and causes the relevant components (recording/reproduction signal processing unit 41, deck unit 40, servo circuit 42) to start reproducing data.

Upon completion of data reproduction from groove tracks, control is returned from step F112 to step F102. In step F102, the system controller 43 again orders the laser driver/APC circuit 120 to generate laser power for data reproduction from land tracks. In step F103, the system controller 43 causes the relevant components to access the address at which the recording was interrupted. In step F104, the system controller 43 orders the laser driver/APC circuit 120 to generate laser power for writing data to land tracks. In step F105, the system controller 43 causes the recording of data to be resumed.

The steps in FIG. 21 eliminate the need for reversing the spindle rotating direction upon data reproduction from groove tracks while the recording of data to land tracks is in progress. With no time loss for spindle rotation switchover, the recording of data to lands and the reproduction of data from grooves are alternated. That is made possible because the disc is rotated always in the forward direction by, say, the embodiment 3 in FIG. 12 for both recording to land tracks and reproduction from groove tracks. The inventive system enhances its usefulness by smoothly alternating the recording to land tracks and the reproduction from groove tracks while benefiting from the above-mentioned signal quality improvement and other advantages stemming from the reversed disc rotating directions between recording and reproduction.

Although FIG. 21 shows the processing example in which the recording of data to lands is interrupted to give way to data reproduction from grooves, this is not limitative of the invention. Alternatively, as soon as the necessary recording to lands is completed, reproduction from grooves may be started immediately (i.e., with the disc rotated continuously). In this case, there also is no need to switch the disc rotating direction, so that write and read operations can be performed at high speed.

Whereas the steps outlined in FIG. 21 have been described above in conjunction with the embodiment 3 listed in FIG. 12, the processing of FIG. 21 may also be carried out in a similarly viable manner in connection with the recording/reproducing methods of the embodiments 4, 5a, 6b, 7b, and 8a listed in FIG. 12.

6.2 Processing for Recording to Groove Tracks

Figure 22:
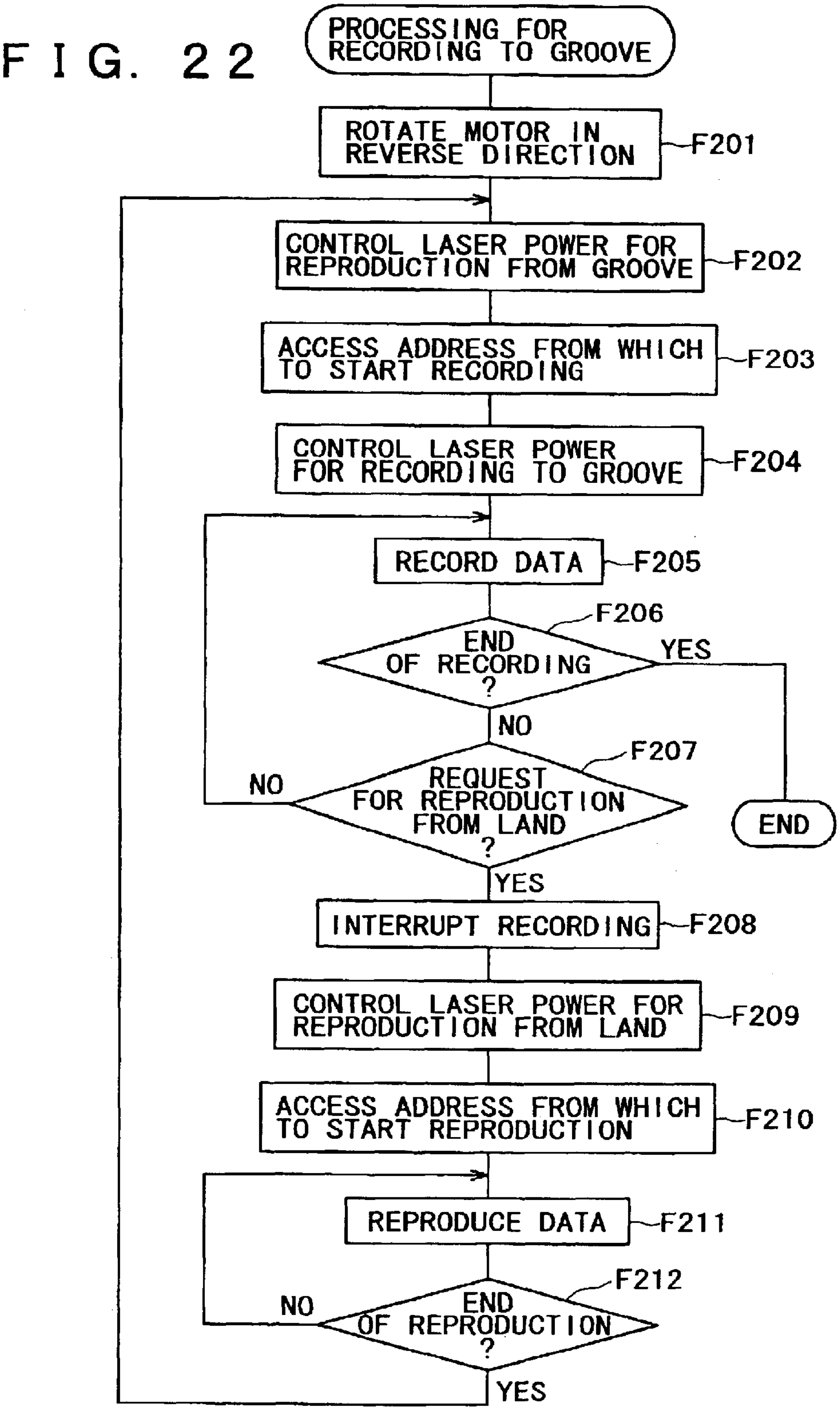
FIG. 22 is a flowchart of steps for recording to grooves according to the invention.

Described below with reference to FIG. 22 are typical steps that may be carried out by the system controller 43 in recording data to grooves, with the recording/reproducing method of the embodiment 3 also assumed to be in use. At the time of recording to groove tracks, the system controller 43 first causes the spindle motor 52 to rotate in the reverse direction in step F201. In step F202, the system controller 43 orders the laser driver/APC circuit 120 to generate laser power for data reproduction from groove tracks. In step F203, the system controller 43 controls the servo processor 112 so that the latter will cause the optical head 53 and magnetic head 54 to access a suitable groove track address from which to start recording.

Following the access, the system controller 43 reaches step F204 and orders the laser driver/APC circuit 120 to generate laser power for writing data to groove tracks. In step F205, the system controller 43 causes the relevant components (recording/reproduction signal processing unit 41, deck unit 40, servo circuit 42) to start recording data.

In step F206, a check is made to see if the recording has ended. If the end of recording is detected, the processing is terminated. During recording, a request may occur (in step F207) for data reproduction from a land track. In that case, step F207 is followed by step F208 in which the system controller 43 orders the recording/reproduction signal processing unit 41 to interrupt its recording process. In step F209, the system controller 43 orders the laser driver/APC circuit 120 to generate laser power for data reproduction from land tracks. In step F210, the system controller 43 causes the optical head 53 and magnetic head 54 to access an appropriate land track address from which to start reproduction. Upon completion of the access, the system controller 43 reaches step F211 and causes the relevant components (recording/reproduction signal processing unit 41, deck unit 40, servo circuit 42) to start reproducing data.

Upon completion of data reproduction from land tracks, control is returned from step F212 to step F202. In step F202, the system controller 43 again orders the laser driver/APC circuit 120 to generate laser power for data reproduction from groove tracks. In step F203, the system controller 43 causes the relevant components to access the address at which the recording was interrupted. In step F204, the system controller 43 orders the laser driver/APC circuit 120 to generate laser power for writing data to groove tracks. In step F205, the system controller 43 causes the recording of data to be resumed.

The steps in FIG. 22 eliminate the need for reversing the spindle rotating direction upon data reproduction from land tracks while the recording of data to groove tracks is in progress. With no time loss for spindle rotation switchover, the recording of data to grooves and the reproduction of data from lands are alternated. That is made possible because the disc is rotated always in the reverse direction illustratively by the embodiment 3 in FIG. 12 for both recording to groove tracks and reproduction from land tracks. The inventive system enhances its usefulness by smoothly alternating the recording to groove tracks and the reproduction from land tracks while benefiting from the above-described signal quality improvement and other advantages stemming from the reversed disc rotating directions between recording and reproduction.

Although FIG. 22 shows the processing example in which the recording of data to grooves is interrupted to give way to data reproduction from lands, this is not limitative of the invention. Alternatively, as soon as the necessary recording to grooves is completed, reproduction from lands may be started immediately (i.e., with the disc rotated continuously). In this case, there also is no need to switch the disc rotating direction, so that write and read operations can be performed at high speed.

Whereas the steps outlined in FIG. 22 have been described above in conjunction with the embodiment 3 listed in FIG. 12, the processing of FIG. 22 may also be carried out in a similarly viable manner in connection with the recording/reproducing methods of the embodiments 4, 5b, 6a, 7a, and 8b listed in FIG. 12.

6.3 Processing for Reproduction from Land Tracks

Described below with reference to FIG. 23 are typical steps that may be carried out by the system controller 43 in reproducing data from lands, with the recording/reproducing method of the embodiment 3 also assumed to be in use. At the time of reproduction from land tracks, the system controller 43 first causes the spindle motor 52 to rotate in the reverse direction in step F301. In step F302, the system controller 43 orders the laser driver/APC circuit 120 to generate laser power for data reproduction from land tracks. In step F303, the system controller 43 controls the servo processor 112 so that the latter will cause the optical head 53 and magnetic head 54 to access a suitable land track address from which to start reproduction.

Following the access, the system controller 43 reaches step F304 and causes the relevant components (recording/reproduction signal processing unit 41, deck unit 40, servo circuit 42) to start reproducing data.

In step F305, a check is made to see if the reproduction has ended. If the end of reproduction is detected, the processing is terminated. During reproduction, a request may occur (in step F306) for writing data to a groove track. In that case, step F306 is followed by step F307 in which the system controller 43 orders the recording/reproduction signal processing unit 41 to interrupt its reproduction process. In step F308, the system controller 43 orders the laser driver/APC circuit 120 to generate laser power for reproducing data from groove tracks. In step F309, the system controller 43 causes the optical head 53 and magnetic head 54 to access an appropriate groove track address from which to start recording. Upon completion of the access, the system controller 43 reaches step F310 and orders the laser driver/APC circuit 120 to generate laser power for writing data to groove tracks. In step F311, the system controller 43 causes the relevant components (recording/reproduction signal processing unit 41, deck unit 40, servo circuit 42) to start recording data.

Upon completion of data recording to groove tracks, control is returned from step F312 to step F302. In step F302, the system controller 43 again orders the laser driver/APC circuit 120 to generate laser power for data reproduction from land tracks. In step F303, the system controller 43 causes the relevant components to access the address at which the reproduction was interrupted. In step F304, the system controller 43 causes the reproduction of data to be resumed.

When the embodiment 3 listed in FIG. 12 is in use, the disc is rotated in the reverse direction for both recording to groove tracks and reproduction from land tracks. For that reason, the steps in FIG. 23 performed in conjunction with the embodiment 3 have no need for reversing the spindle rotating direction upon data recording to groove tracks while the reproduction of data from land tracks is in progress. With no time loss for spindle rotation switchover, the reproduction of data from lands and the recording of data to grooves are alternated. In this case, the inventive system also enhances its usefulness by smoothly alternating the data reproduction from land tracks and the recording of data to groove tracks while benefiting from the above-described signal quality improvement and other advantages stemming from the reversed disc rotating directions between recording and reproduction.

Although FIG. 23 shows the processing example in which the reproduction of data from lands is interrupted to give way to data recording to grooves, this is not limitative of the invention. Alternatively, as soon as the necessary reproduction from lands is completed, recording to grooves may be started immediately (i.e., with the disc rotated continuously). In this case, there also is no need to switch the disc rotating direction, so that write and read operations can be performed at high speed.

Whereas the steps outlined in FIG. 23 have been described above in conjunction with the embodiment 3 listed in FIG. 12, the processing of FIG. 23 may also be carried out in a similarly viable manner in connection with the recording/reproducing methods of the embodiments 4, 5b, 6a, 7a, and 8b listed in FIG. 12.

6.4 Processing for Reproduction from Groove Tracks

Figure 24:
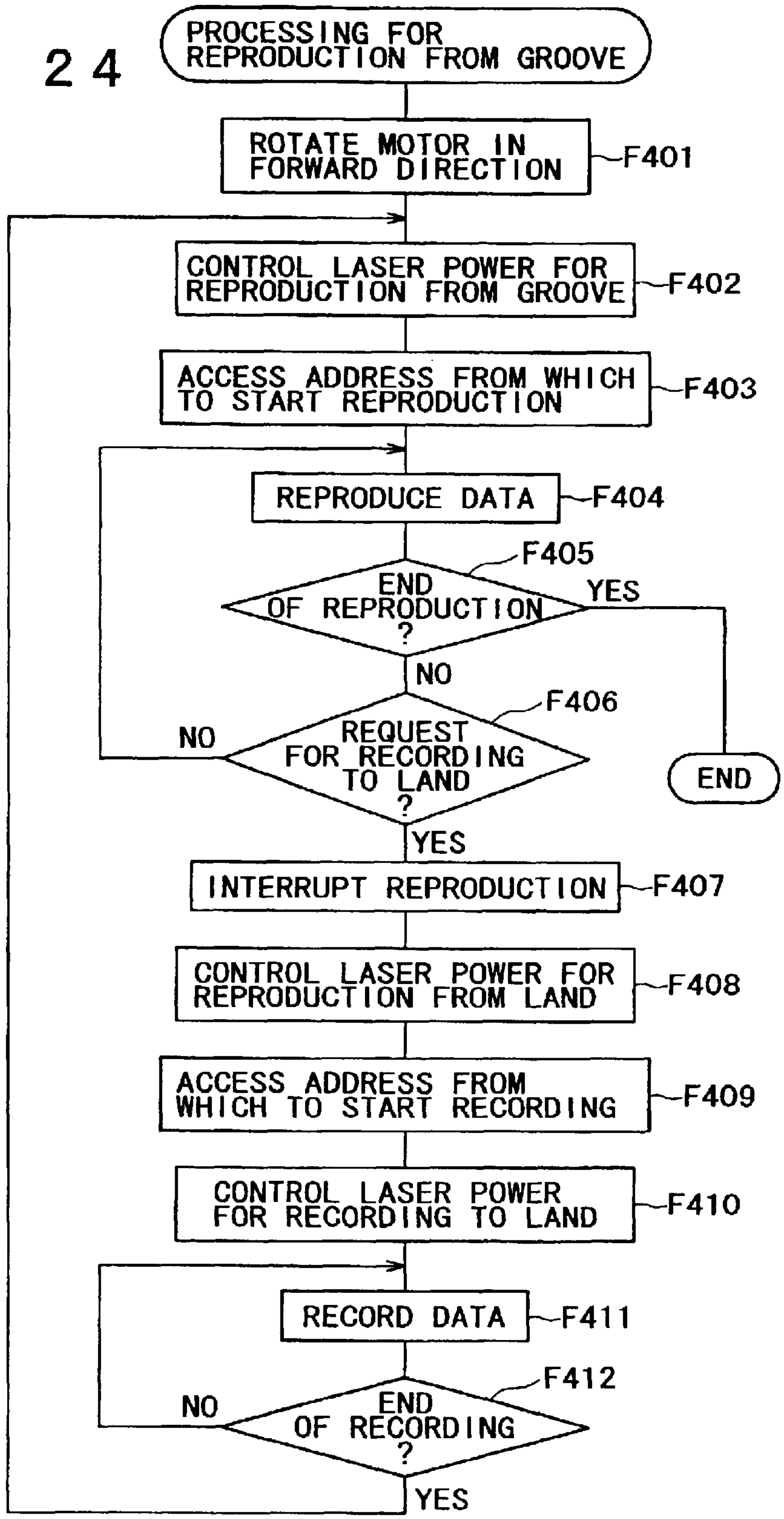
FIG. 24 is a flowchart of steps for reproduction from grooves according to the invention.

Described below with reference to FIG. 24 are typical steps that may be carried out by the system controller 43 in reproducing data from grooves, with the recording/reproducing method of the embodiment 3 also assumed to be in use. At the time of reproduction from groove tracks, the system controller 43 first causes the spindle motor 52 to rotate in the forward direction in step F401. In step F402, the system controller 43 orders the laser driver/APC circuit 120 to generate laser power for reproducing data from groove tracks. In step F403, the system controller 43 controls the servo processor 112 so that the latter will cause the optical head 53 and magnetic head 54 to access a suitable groove track address from which to start reproduction.

Following the access, the system controller 43 reaches step F404 and causes the relevant components (recording/reproduction signal processing unit 41, deck unit 40, servo circuit 42) to start reproducing data.

In step F405, a check is made to see if the reproduction has ended. If the end of reproduction is detected, the processing is terminated. During reproduction, a request may occur (in step F406) for writing data to a land track. In that case, step F406 is followed by step F407 in which the system controller 43 orders the recording/reproduction signal processing unit 41 to interrupt its reproduction process. In step F408, the system controller 43 orders the laser driver/APC circuit 120 to generate laser power for reproducing data from land tracks. In step F409, the system controller 43 causes the optical head 53 and magnetic head 54 to access an appropriate land track address from which to start recording. Upon completion of the access, the system controller 43 reaches step F410 and orders the laser driver/APC circuit 120 to generate laser power for writing data to land tracks. In step F411, the system controller 43 causes the relevant components (recording/reproduction signal processing unit 41, deck unit 40, servo circuit 42) to start recording data.

Upon completion of data recording to land tracks, control is returned from step F412 to step F402. In step F402, the system controller 43 again orders the laser driver/APC circuit 120 to generate laser power for data reproduction from groove tracks. In step F403, the system controller 43 causes the relevant components to access the address at which the reproduction was interrupted. In step F404, the system controller 43 causes the reproduction of data to be resumed.

When the embodiment 3 listed in FIG. 12 is in use, the disc is rotated in the forward direction for both reproduction from groove tracks and recording to land tracks. For that reason, the steps in FIG. 24 performed in conjunction with the embodiment 3 have no need for reversing the spindle rotating direction upon data recording to land tracks while the reproduction of data from groove tracks is in progress.

With no time loss for spindle rotation switchover, the reproduction of data from grooves and the recording of data to lands are alternated. In this case, the inventive system also enhances its usefulness by smoothly alternating the reproduction of data from groove tracks and the recording of data to land tracks while benefiting from the above-described signal quality improvement and other advantages stemming from the reversed disc rotating directions between recording and reproduction.

Although FIG. 24 shows the processing example in which the reproduction of data from grooves is interrupted to give way to the recording of data to lands, this is not limitative of the invention. Alternatively, as soon as the necessary reproduction from grooves is completed, recording to lands may be started immediately (i.e., with the disc rotated continuously). In this case, there also is no need to switch the disc rotating direction, so that write and read operations can be performed at high speed.

Whereas the steps outlined in FIG. 24 have been described above in conjunction with the embodiment 3 listed in FIG. 12, the processing of FIG. 24 may also be carried out in a similarly viable manner in connection with the recording/reproducing methods of the embodiments 4, 5a, 6b, 7b, and 8a listed in FIG. 12.

7. Processing for Laser Power Calibration

Whenever a disc 51 is loaded anew, the recording/reproducing apparatus carries out a calibration process to set optimal laser power levels for use on the loaded disc. Specifically, the calibration process involves performing write and read operations on the disc 51 on a trial basis to determine four optimal set-points: a laser power level for recording to lands, a laser power level for reproduction from lands, a laser power level for recording to grooves, and a laser power level for reproduction from grooves. The optimal set-points thus determined are set to the laser driver/APC circuit 120. In each of the processing examples outlined in FIGS. 21 through 24 above, the system controller 43 orders the laser driver/APC circuit 120 to adopt one of the four optimal set-points derived from the calibration.

Where the recording/reproducing methods of the embodiments are in use, the disc rotating direction is reversed between recording and reproduction as well as between land tracks and groove tracks being dealt with. In such cases, the usual way of calibrating the laser power level for recording to lands, for reproduction from lands, for recording to grooves, or for reproduction from grooves would be by rotating the disc in the corresponding direction depending on the type of operation about to take place.

Figure 25:
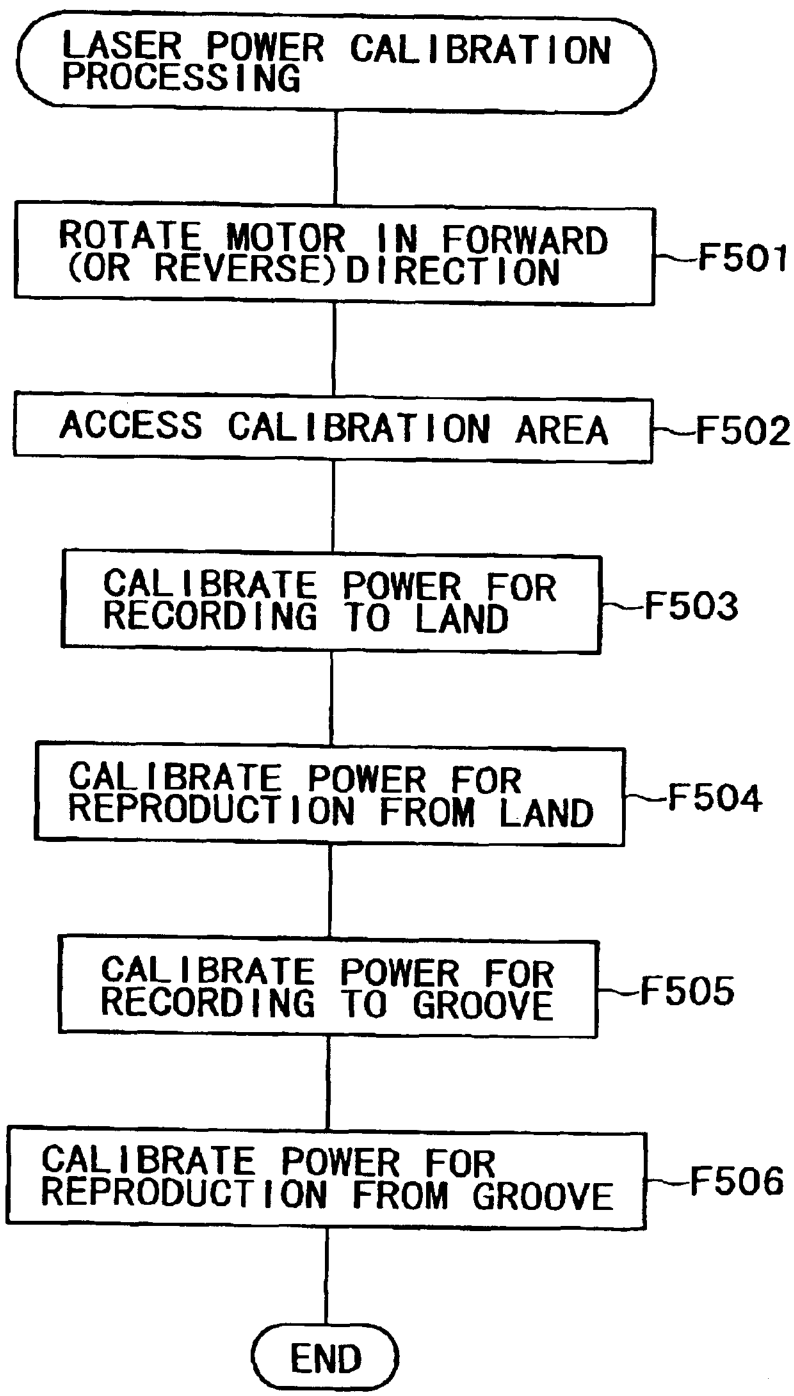
FIG. 25 is a flowchart of steps for laser power calibration according to the invention.

However, the laser power calibration process according to the invention is designed to detect the four optimal set-points above consecutively without regard to the disc rotating direction in effect. FIG. 25 is a flowchart of typical steps carried out by the system controller 43 in calibrating the laser power levels when the disc 51 is loaded into the recording/reproducing apparatus.

In step F501, the system controller 43 causes the spindle motor 52 to rotate in either the forward or the reverse direction for laser power calibration. Either of the two directions will do. Illustratively, if the disc has been rotated in a given direction in the most recent operation such as retrieval of management information, that disc rotating direction may be selected In step F502, the system controller 43 orders the servo processor 112 to have the optical head 53 and magnetic head 54 access a calibration area on the disc 51 (i.e., a trial write area formatted on the disc).

In step F503, the laser power for recording to lands is calibrated in the calibration area. Specifically, trial read and write operations are performed on land tracks in the same manner as in the above-described experiments wherein the overwrite characteristic was measured, until an optimal jitter point is detected and an optimal laser power level is determined correspondingly for recording data to lands. The optimal laser power set-point thus selected for writing to lands is set to the laser driver/APC circuit 120.

In step F504, the laser power for reproduction from lands is calibrated. In this case, a write operation is carried out on land tracks using the optimal laser power set-point established in step F502 above. What has been written is then reproduced and the jitter level is observed while the reproduction laser power level is being varied. In other words, the operations involved are substantially the same as those in the above-described experiments wherein the reproduction laser power characteristic was measured. When an optimal jitter point is detected, the reproduction laser power in effect at that point is determined as an optimal laser power level for reproducing data from land tracks. The laser power set-point thus selected for reproduction from lands is set to the laser driver/APC circuit 120.

In step F505, the laser power for recording to grooves is calibrated. Specifically, trial read and write operations are performed on groove tracks in the same manner as in the above-described experiments wherein the overwrite characteristic was measured, until an optimal jitter point is detected and an optimal laser power level is determined correspondingly for recording data to groove tracks. The optimal laser power set-point thus selected for writing to grooves is set to the laser driver/APC circuit 120.

In step F506, the laser power for reproduction from grooves is calibrated. In this case, a write operation is carried out on groove tracks using the optimal laser power set-point established in step F505 above. What has been written is then reproduced and the jitter level is observed while the reproduction laser power level is being varied. In other words, the operations involved are substantially the same as those in the above-described experiments wherein the reproduction laser power characteristic was measured. When an optimal jitter point is detected, the reproduction laser power in effect at that point is determined as an optimal laser power level for reproducing data from groove tracks. The laser power set-point thus selected for reproduction from grooves is set to the laser driver/APC circuit 120.

The steps above when carried out successively constitute the laser power calibration process. The sequence of steps F503 through F506 may be varied as needed. While the laser power calibration for determining optimal set-points is in progress, the disc rotating direction is kept constant. Maintaining the same disc rotating direction eliminates time losses that would occur if the rotating direction were to be changed during the calibration process.

The disc rotating direction need not be switched during the calibration for the following reasons: the reproduction power characteristic shown in FIG. 4 indicates that the optimal jitter level is at 1.6 mW on land tracks in the "forward to forward" rotation setup as well as in the "forward to reverse" rotation setup. On groove tracks, the optimal jitter level is at 1.5 mW in both the "forward to forward" and the "forward to reverse" rotation setups.

That is, the point of inflection of the reproduction power characteristic remains substantially the same on land and groove tracks in the "forward to forward" rotation setup as well as in the "forward to reverse" rotation setup. The only difference is that the jitter level in the "forward to reverse" rotation setup is somewhat lower than in the "forward to forward" rotation setup.

The observations above signify that as long as the algorithm for calibration regards a minimum jitter level as representative of an optimal reproduction laser power level, the results are approximately the same no matter which direction the disc 51 is rotated in during the calibration process. Simply put, the disc 51 may be rotated in any one direction during the calibration of laser power for data reproduction.

The overwrite characteristics shown in FIGS. 5 and 6 indicate that the point of inflection of the overwrite characteristic curves on land tracks is at 6 mW in the "forward to forward" rotation setup as well as in the "forward to reverse" rotation setup. On groove tracks, the point of inflection of the overwrite characteristic curves is at 5.5 mW in both the "forward to forward" and the "forward to reverse" rotation setups.

That is, the point of inflection of the overwrite characteristics remains substantially the same over land and groove tracks in the "forward to forward" rotation setup as well as in the "forward to reverse" rotation setup. It follows that as long as the algorithm for calibration is designed to find the point of inflection of the overwrite characteristics so as to determine an optimal recording laser power level, the results are approximately the same no matter which direction the disc 51 is rotated in during the calibration process. In other words, the disc 51 may be rotated in any one direction during the calibration of laser power for data recording.

For the reasons above, there is no need to change the disc rotating direction between steps F502 and F506. This makes it possible to complete the laser power calibration process rapidly.

Since the disc may be rotated in any one direction during laser power calibration, it is possible to carry out the calibration during the ongoing read or write operation. The optimal laser power level varies illustratively depending on ambient temperature, deterioration in disc materials, and other conditions. That means the laser power levels established by the processing in FIG. 25 upon loading of the disc may no longer be optimal in the course of subsequent operations.

In that case, if the parameters such as the jitter level and error rate observed during data reproduction indicate a deteriorating situation, then a laser power calibration process may be carried out to correct that situation. Part or all of the four laser power set-points described above may then be calibrated. In any case, transition to the calibration is effected with the preceding rotating direction of the disc 51 kept unchanged. This eliminates any time losses that would occur if the rotating direction were to be reversed.

The availability of the calibration with the rotating direction held unchanged signifies another advantage: it is possible to complete a series of steps or operations quickly, from a write or a read operation to an emergency laser power calibration process and back to the initial write or read operation, and so on.

In other words, the embodiments of this invention permit switching of the disc rotating direction between data recording and reproduction as well as between lands and grooves being operated on, thereby improving reproduced signal quality. Furthermore, the embodiments allow the disc rotating direction to remain unchanged upon transition from a read or write operation to a laser power calibration process or vice versa. This enables the overall performance of the apparatus to continue efficiently without interruption.

8. Other Variations of the Invention

While the invention has been described in conjunction with specific embodiments, these should not be construed as limiting the scope of the invention but as merely providing illustrations of some of the presently preferred embodiments of this invention. It is evident that many alternatives, modifications and variations will become apparent to those skilled in the art in light of the foregoing description. For example, although the invention has been discussed in connection with the domain wall displacement detection system, this is not limitative of the invention. The invention also applies effectively to the magnetic amplifying magneto-optical system.

The structure of the recording/reproducing apparatus according to the invention is not limited to what is shown in FIG. 14. Alternatively, the apparatus may be structured for integrated, incorporated, or other types of use in personal computers, audio/visual equipment, and other devices.

The invention may also be implemented solely as a recording apparatus or a reproducing apparatus. The reproducing apparatus according to the invention may rotate in the reverse direction the disc on which data have been recorded normally by a conventional recording apparatus. The data recorded by the conventional recording apparatus may then be read from the disc by the inventive reproducing apparatus at a high signal quality level. The recording apparatus according to the invention may record data to the disc rotated in a direction reverse to the direction in which the disc is normally rotated by a conventional reproducing apparatus for data reproduction. The data may then be reproduced from the disc by the conventional reproducing apparatus at a higher signal quality level than before.

Thus the scope of the invention should be determined by the appended claims and their legal equivalents, rather than by the examples given.

What is claimed is:

1. A magneto-optical recording/reproducing method for emitting a laser beam to a disc recording medium having information recorded thereon earlier by magnetic field modulation, said laser beam causing said disc recording medium to develop a temperature distribution such as to generate a driving force for moving a domain wall of a magnetic domain in the medium so that said magnetic domain smaller in diameter than a spot of said laser beam is expanded sufficiently to let information recorded in the domain be detected, said magneto-optical recording/reproducing method comprising the steps of:

recording information to said disc recording medium while rotating the medium in a first rotating direction; and reproducing the information that was recorded to said disc recording medium in said recording step, while rotating the medium in a second rotating direction reverse to said first rotating direction.

2. A magneto-optical recording/reproducing method according to claim 1, wherein said disc recording medium has at least a groove track and a land track formed thereon, said groove track and said land track being both used to record information.

3. A magneto-optical recording/reproducing method according to claim 2, further comprising the steps of rotating said disc recording medium in said first rotating direction when recording information to said land track and said groove track, and of rotating said disc recording medium in said second rotating direction when reproducing the information from said land track and said groove track.

4. A magneto-optical recording/reproducing method according to claim 2, further comprising the steps of rotating said disc recording medium in said first rotating direction when recording information to said land track and reproducing information from said groove track, and of rotating said disc recording medium in said second rotating direction when recording information to said groove track and reproducing information from said land track.

5. A magneto-optical recording/reproducing method according to claim 2, further comprising the step of switching the rotating direction of said disc recording medium from said first rotating direction to said second rotating direction or vice versa with regard to either said land track or said groove track only, between the recording and the reproduction of information to and from the track being selected.

6. A magneto-optical recording/reproducing method according to claim 2, further comprising the steps of:

switching the rotating direction of said disc recording medium from said first rotating direction to said second rotating direction or vice versa between the recording of information to said land track and the recording of information to said groove track;

alternating the recording of information to said land track and the reproduction of information from said groove track without switching the rotating direction of said disc recording medium in between; and alternating the recording of information to said groove track and the reproduction of information from said land track without switching the rotating direction of said disc recording medium in between.

7. A magneto-optical recording/reproducing method according to claim 2, further comprising the step of calibrating at least part of optimal laser power levels for recording to said land track, for reproduction from said land track, for recording to said groove track, and for reproduction from said groove track while rotating said disc recording medium in the same direction as that most recently in effect.

8. A magneto-optical recording/reproducing method according to claim 2, further comprising the step of calibrating optimal laser power levels for recording to said land track, for reproduction from said land track, for recording to said groove track, and for reproduction from said groove track consecutively without switching the rotating direction of said disc recording medium.

9. A magneto-optical recording/reproducing method according to claim 1, wherein said recording step further comprises the steps of formatting a data stream, which is information to be recorded to said disc recording medium, in units of error-correcting blocks, and of encoding the formatted data stream for recording to said disc recording medium; and wherein said reproducing step further comprises the steps of re-sorting a data stream read from said disc recording medium in the units used in said formatting step, and of decoding the re-sorted data stream for reproduction.

10. A magneto-optical recording/reproducing method according to claim 9, wherein said formatting step further comprises supplementing said data stream with header data made up of a bit string having the same sequence in a forward and a reverse direction of said data stream.

11. A magneto-optical recording/reproducing method according to claim 1, wherein said recording step further comprises the steps of re-sorting a data stream, which is information to be recorded to said disc recording medium, in units of error-correcting blocks, and of formatting the re-sorted data stream for recording to said disc recording medium; and wherein said reproducing step further comprises the step of decoding a data stream read from said disc recording medium in the units used in said formatting step for reproduction.

12. A magneto-optical recording/reproducing method according to claim 11, wherein said formatting step comprises supplementing said data stream with header data made up of a bit string having the same sequence in a forward and a reverse direction of said data stream.

13. A magneto-optical recording/reproducing apparatus for use with a disc recording medium having information recorded thereon by magnetic field modulation, the apparatus emitting a laser beam to said disc recording medium thereby to develop a temperature distribution such as to generate a driving force for moving a domain wall of a magnetic domain in the medium so that said magnetic domain smaller in diameter than a spot of said laser beam is expanded sufficiently to let information recorded in the domain be detected, said magneto-optical recording/reproducing apparatus comprising:

magneto-optical bead means for writing and reading information to and from said disc recording medium;

write signal processing means which, upon recording of information to said disc recording medium, supplies said magneto-optical head means with write data having undergone a predetermined signal process;

read signal processing means which, upon reproduction of information from said disc recording medium, obtains read data by performing a predetermined signal process on data read from said disc recording medium by said magneto-optical head means;

rotating means for rotating said disc recording medium; and controlling means for causing said rotating means to rotate said disc recording medium in a first rotating direction while information is being recorded to the medium, said controlling means further causing said rotating means to rotate said disc recording medium in a second rotating direction reverse to said first rotating direction while the information recorded to the medium is being reproduced therefrom.

14. A magneto-optical recording/reproducing apparatus according to claim 13, wherein said disc recording medium has at least a groove track and a land track formed thereon; and wherein said magneto-optical head means records information to both said groove track and said land track.

15. A magneto-optical recording/reproducing apparatus according to claim 14, wherein said controlling means causes said rotating means to rotate said disc recording medium in said first rotating direction while information is being recorded to said land track and said groove track, said controlling means further causing said rotating means to rotate said disc recording medium in said second rotating direction while information is being reproduced from said land track and said groove track.

16. A magneto-optical recording/reproducing apparatus according to claim 14, wherein said controlling means causes said rotating means to rotate said disc recording medium in said first rotating direction while information is being recorded to said land track and reproduced from said groove track, said controlling means further causing said rotating means to rotate said disc recording medium in said second rotating direction while information is being recorded to said groove track and reproduced from said land track.

17. A magneto-optical recording/reproducing apparatus according to claim 14, wherein said controlling means causes said rotating means to switch the rotating direction of said disc recording medium from said first rotating direction to said second rotating direction or vice versa with regard to either said land track or said groove track only, between the recording and the reproduction of information to and from the track being selected.

18. A magneto-optical recording/reproducing apparatus according to claim 14, wherein said controlling means causes said rotating means to switch the rotating direction of said disc recording medium from said first rotating direction to said second rotating direction or vice versa between the recording of information to said land track and the recording of information to said groove track;

wherein said controlling means further alternates the recording of information to said land track and the reproduction of information from said groove track without switching the rotating direction of said disc recording medium in between; and wherein said controlling means further alternates the recording of information to said groove track and the reproduction of information from said land track without switching the rotating direction of said disc recording medium in between.

19. A magneto-optical recording/reproducing apparatus according to claim 14, wherein said controlling means further calibrates at least part of optimal laser power levels for recording to said land track, for reproduction from said land track, for recording to said groove track, and for reproduction from said groove track while rotating said disc recording medium in the same direction as that most recently in effect.

20. A magneto-optical recording/reproducing apparatus according to claim 14, wherein said controlling means further calibrates optimal laser power levels for recording to said land track, for reproduction from said land track, for recording to said groove track, and for reproduction from said groove track consecutively without switching the rotating direction of said disc recording medium.

21. A magneto-optical recording/reproducing apparatus according to claim 13, wherein, upon recording, said write signal processing means further formats a data stream, which is information to be recorded to said disc recording medium, in units of error-correcting blocks, and encodes the formatted data stream before supplying the encoded data stream to said magneto-optical head means for recording to said disc recording medium; and wherein, upon reproduction, said read signal processing means further re-sorts a data stream read by said magneto-optical head means from said disc recording medium, in the units used in the formatting, and decodes the re-sorted data stream for reproduction.

22. A magneto-optical recording/reproducing apparatus according to claim 21, wherein the formatting performed by said write signal processing means further comprises supplementing said data stream with header data made up of a bit string having the same sequence in a forward and a reverse direction of said data stream.

23. A magneto-optical recording/reproducing apparatus according to claim 13, wherein, upon recording, said write signal processing means further re-sorts a data stream, which is information to be recorded to said disc recording medium, in units of error-correcting blocks, and formats the re-sorted data stream before supplying the formatted data stream to said magneto-optical head means for recording to said disc recording medium; and wherein, upon reproduction, said read signal processing means further decodes a data stream read by said magneto-optical head means from said disc recording medium, in the units used in the formatting.

24. A magneto-ontical recording/reproducing apparatus according to claim 23, wherein the formatting performed by said write signal processing means further comprises supplementing said data stream with header data made up of a bit string having the same sequence in a forward and a reverse direction of said data stream.

* * * * *